United States Patent [19]

Jensen

[11] 4,139,089
[45] Feb. 13, 1979

[54] ARTICLE FEED MECHANISM

[75] Inventor: James W. Jensen, Hastings, Mich.

[73] Assignee: Gulf & Western Manufacturing Company, Southfield, Mich.

[21] Appl. No.: 824,750

[22] Filed: Aug. 15, 1977

[51] Int. Cl.² ............................................. B65G 25/02
[52] U.S. Cl. .................................... 198/621; 198/740; 198/741
[58] Field of Search ............... 198/339, 345, 487, 575, 198/621, 736, 740, 741; 214/1 BB; 29/563, 759, 791, 822

[56] References Cited

U.S. PATENT DOCUMENTS

| | | | |
|---|---|---|---|
| 3,011,464 | 12/1961 | Danly et al. | 198/621 |
| 3,061,078 | 10/1962 | Davies | 198/621 |
| 3,590,986 | 7/1971 | Andrews et al. | 198/621 |
| 3,768,667 | 10/1973 | Paumier et al. | 214/1 BB |
| 3,782,561 | 1/1974 | Orii | 214/1 BB |

FOREIGN PATENT DOCUMENTS 1027283  4/1966  United Kingdom ..................... 198/621

*Primary Examiner*—Joseph E. Valenza

*Attorney, Agent, or Firm*—Meyer, Tilberry & Body

[57] ABSTRACT

A mechanism is provided for advancing articles step by step between work stations of a press. The mechanism includes a pair of bracket assemblies mounted on opposite sides of the press frame and provided with feed bar support assemblies including members supporting a pair of parallel feed bar-feed finger members for longitudinal and lateral reciprocation to achieve article transfer. The bracket assembly includes a first portion fixed on the press frame and a second portion which carries the corresponding feed bar support assembly and which is pivotal relative to the first bracket portion between use and non-use positions. The drive arrangement for the reciprocable feed bar support members includes portions pivotal with the second bracket portion. The feed bar-feed finger members are detachable, thus enabling the second bracket portions and corresponding portions of the drive arrangements to be pivoted to the non-use position to facilitate access to the press. A plurality of such article feed mechanisms are adapted to be associated with the press and driven in unison by common drive belts and shafts on each of the opposite sides of the press.

21 Claims, 17 Drawing Figures

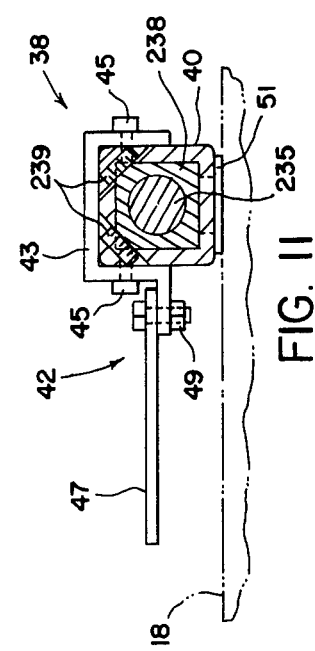

ARTICLE FEED MECHANISM

This invention relates to the art of material handling and, more particularly, to a mechanism for transferring articles relative to work stations of a machine such as a press.

The present invention finds particular utility in connection with the step by step transfer of workpieces along a linear path between a plurality of work stations of a metal-working press and at each of which stations a different forming operation is performed on the workpiece. Accordingly, the invention will be described in detail in conjunction with such use. However, it will be appreciated that the invention is readily applicable to the transfer of a wide variety of articles and the transfer of articles or workpieces relative to a machine other than a metalworking press.

Article transfer mechanisms are often employed in connection with a metalworking press for advancing workpieces step by step inwardly of the press such that a workpiece is picked up at one station, advanced to the next station and then released for the performance of work thereon by the press. Among such transfer mechanisms are those including a pair of longitudinally and laterally reciprocable feed bars having opposed pairs of cooperable feed fingers therebetween. The feed bars are adapted to be displaced laterally away from one another to release the fingers from engagement with an article, displaced longitudinally in one direction to position another set of fingers in alignment with the article, displaced laterally toward one another for the article to be received between the new pair of fingers, and then advanced longitudinally in the opposite direction to move the article to the next work station. Such movement of the feed bars is of course coordinated with the stroke of the press slide such that the engagement, transfer and release functions of the feed mechanisms take place during the non-working portion of the total stroke of the press. The feed bars of such mechanisms have been reciprocated longitudinally and laterally through the use of a variety of drive arrangements including cam and linkage assemblies, oscillating levers and linkage trains, and rack and pinion assemblies.

Often, it is desirable to incorporate a plurality of such article transfer mechanisms in side by side relationship with respect to a common press to utilize the size of the press to the fullest extent in conjunction with maximizing the production rate or output of the press. Still further, it is often possible to utilize longitudinally opposed transfer mechanisms on opposite sides of a press, each of which is operable to transfer an article inwardly of the press past corresponding work stations toward a central location from which the completed articles are suitably removed from the press. Still further, a plurality of such opposed transfer mechanisms can often be employed in side by side relationship, again to utilize the full size of the press.

It will be appreciated that such article transfer mechanisms necessarily include support and drive components adjacent the sides of the press for the feed bar members which extend therebetween and across the bed of the press. Should it become desirable or necessary to have access to components of the press, such as die members at the various work stations, the component parts of the transfer mechanism render access to the press most difficult. Often, the feed mechanism or mechanisms have to be completely disassembled with respect to the press and removed to enable such access. This is not only time consuming but also cumbersome in that the drive arrangements for the transfer mechanisms are often structurally complex and utilize component parts which in total makes the mechanism heavy, awkward and difficult to handle.

With further regard to transfer mechanisms heretofore provided, and especially with regard to the use of a plurality of mechanisms in side by side relationship on a given press, the drive arrangements for reciprocating the feed bar members are not generally adapted to be driven by a common output source of the press and, accordingly, require multiple and possibly individual drives for each of the transfer mechanisms. Accordingly, the provision of a given press with a plurality of such transfer mechanisms results in a structurally complex system of gears, shafts, cams and the like, all of which add to the complexity of gaining access to the press as well as increasing the production and maintenance costs for the transfer mechanisms per se. Moreover, such complexity in the drive arrangements for a plurality of feed mechanisms makes it extremely difficult to obtain and maintain the desired accuracy and timing required with respect to coordinating the transfer of articles by adjacent mechanisms relative to corresponding work stations of the press. Therefore, it is often necessary to reduce the speed of operation of the press in an effort to minimize misfeed of an article and the consequent shut down of the press to clear the misfeed, and to minimize the possibility of damage to the feed mechanism and/or die components of the press due to such a misfeed.

In accordance with the present invention, an article feed mechanism is provided by which the foregoing and other disadvantages of previous mechanisms are overcome or minimized. More particularly, a feed mechanism in accordance with the present invention is constructed of structurally simple, light weight interchangeable parts, thus minimizing production, installation and maintenance costs while facilitating ease of handling of the mechanism during installation and maintenance operations. Preferably, the feed mechanism includes mounting bracket arrangements which enable the feed bars to be disconnected and the support components therefor to be pivoted to a non-use position which facilitates access to the press bed and slide area. Still further, the light weight construction and simplicity of design enables a plurality of such mechanisms to be employed side by side on a given press and driven by a single output take-off from the press through drive arrangements common to feed bar support components on each side of the press. Additionally, the light weight construction and simplicity of structural design facilitates higher speed press operations than heretofore possible and maintenance of the desired accuracy and timing for coordinating article transfer with cycling of the press slide.

In the preferred embodiment, reciprocation of the feed bars laterally with respect to the direction of article feed is achieved through an endless belt or chain drive arrangement which further adds to the simplicity and light weight construction of the feed mechanisms as well as the ability to drive a plurality of such mechanisms by a single drive source from the press. Still further in accordance with the present invention, the feed bar mechanism is readily adapted to feed articles inwardly of the press from opposite sides thereof without the necessity for completely independent opposed feed mechanisms as heretofore required. In this respect, intermediate portions of the feed bars are longitudinally slidably interengaged for relative reciprocation therebetween. This enables reciprocation of the feed bars both longitudinally and laterally toward and away from one another without any special support or drive arrangement at the inner ends thereof as is required with opposed separate feed mechanisms.

It is accordingly an outstanding object of the present invention to provide an improved article feed mechanism for transferring articles along a linear path relative to work stations of a machine such as a press.

A further object is the provision of an article feed mechanism of the foregoing character in which the component parts of the mechanism are structurally interrelated with one another and with the machine on which they are mounted to improve accessibility to component parts of the machine for maintenance and/or replacement purposes.

Yet a further object is the provision of a feed mechanism of the foregoing character having a structurally simple arrangement for driving component parts of the feed mechanism and which readily adapts a plurality of feed mechanisms to be commonly driven in a structurally simpler manner than heretofore possible.

Another object is the provision of a feed mechanism of the foregoing character which enables articles to be fed inwardly of a machine from opposite sides thereof without special support members and/or drive arrangements for the ends of the feed bar members of the mechanism disposed intermediate the opposite sides of the press.

Still a further object is the provision of an article feed mechanism of the foregoing character which is structurally simple, light in weight, and comprised of a minimum number of component parts, thus providing for the mechanism to be economical to produce and maintain, easy to handle during installation and maintenance, and which is efficient in operation.

The foregoing objects and others will in part be obvious and in part pointed out more fully hereinafter in conjunction with the written description of preferred embodiments of the invention shown in the accompanying drawings in which:

FIG. 10 is a side elevation view of the intermediate portion of one of the feed bar units of the feed mechanism;

FIG. 11 is a sectional elevation view of the feed bar unit taken along line 11—11 in FIG. 10;

Figure 1:
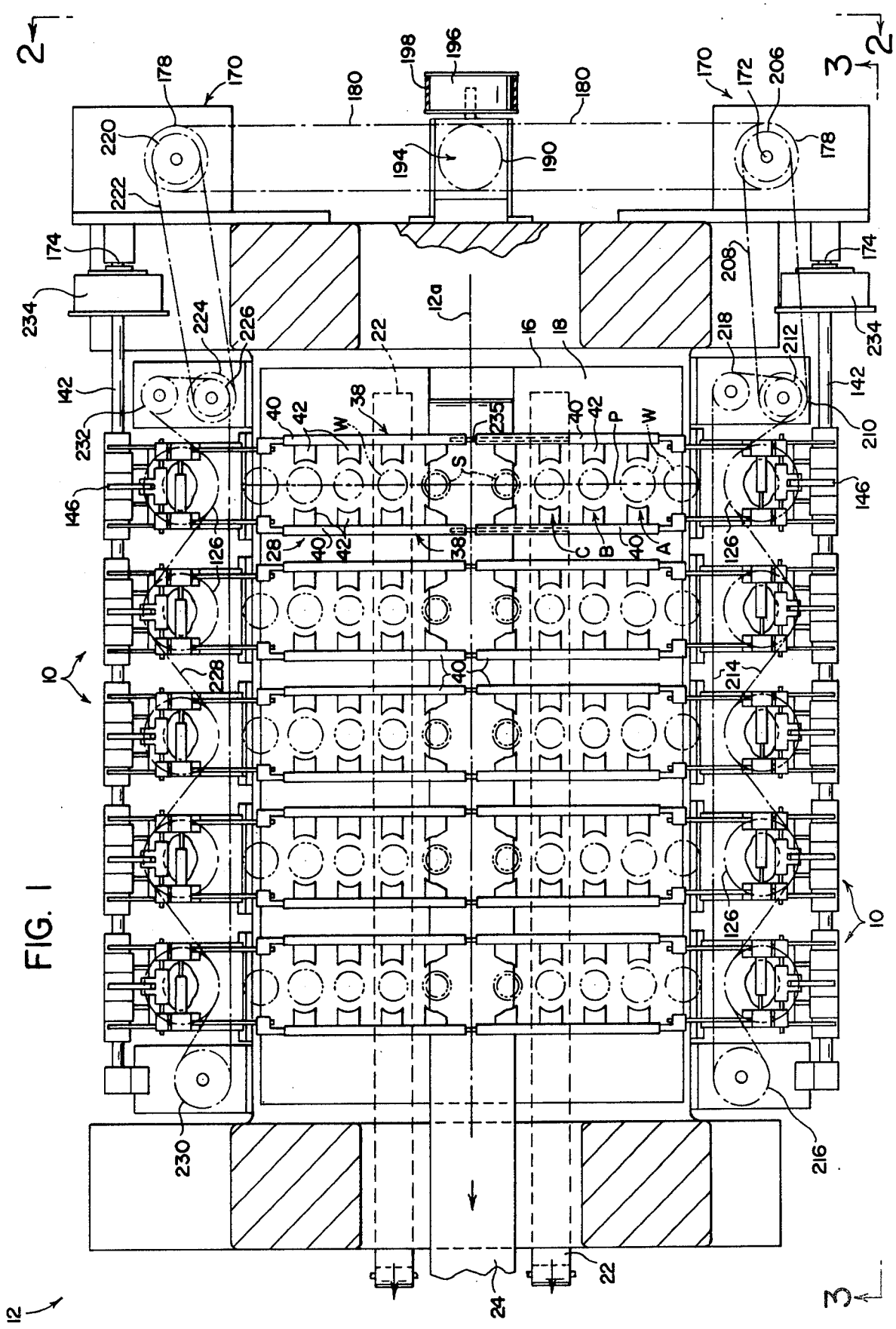
FIG. 1 is a plan view showing a plurality of feed mechanisms in accordance with the present invention mounted in side by side relationship on a metal working press.
Figure 2:
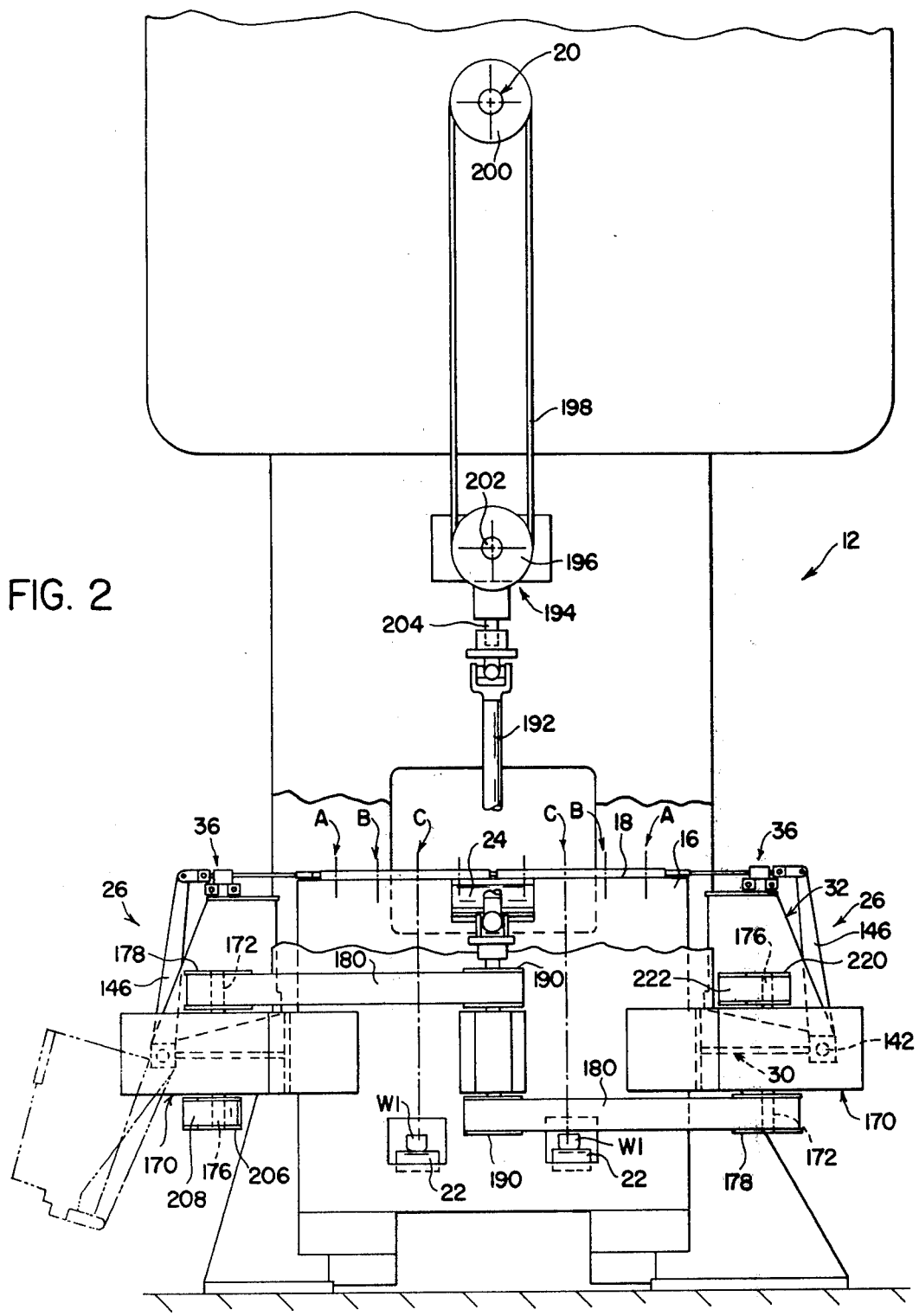
FIG. 2 is an end elevation view taken along line 2—2 in FIG. 1.
Figure 3:
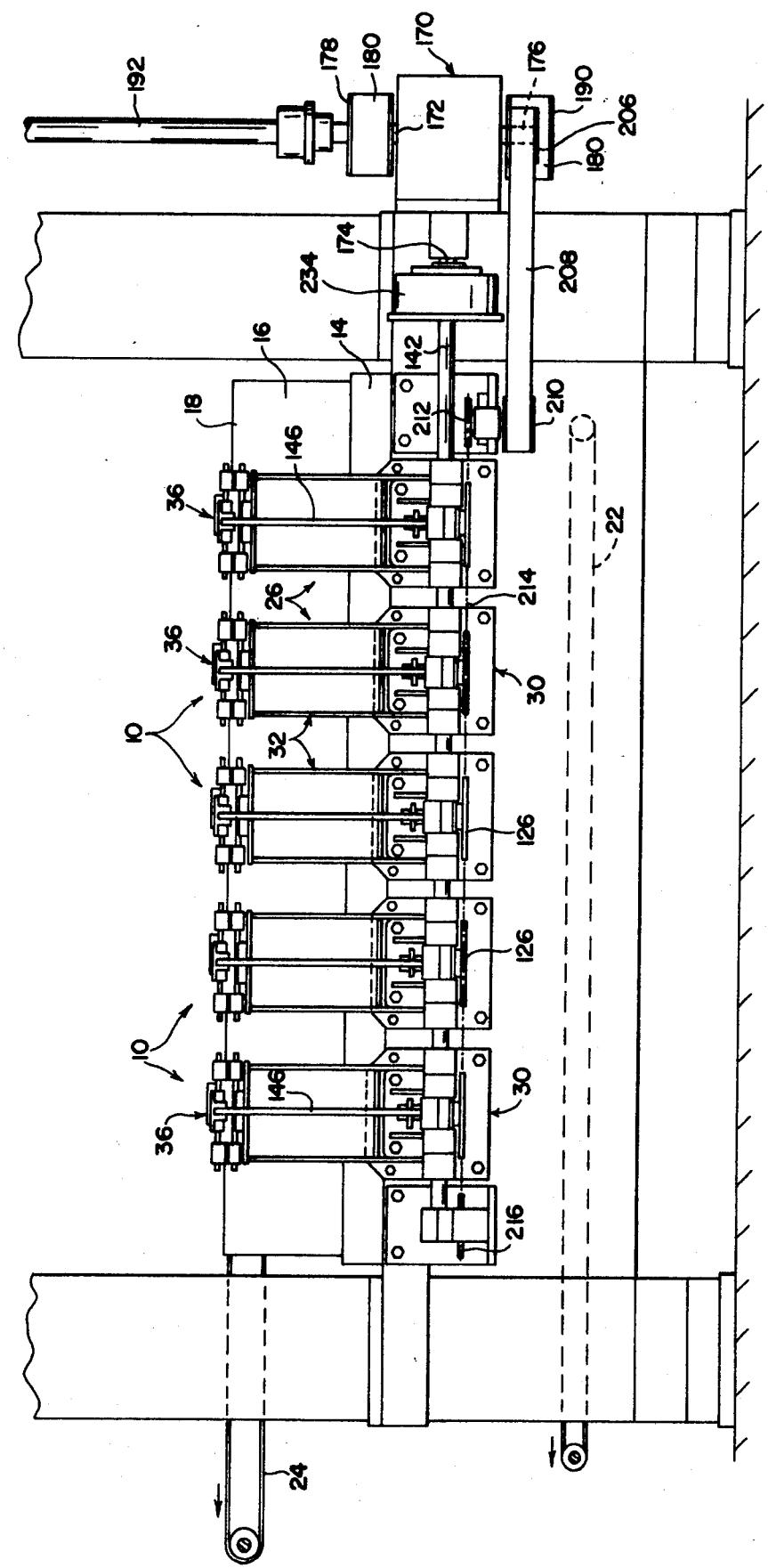
FIG. 3 is a side elevation view taken along line 3—3 in FIG. 1.

Referring now in greater detail to the drawings wherein the showings are for the purpose of illustrating preferred embodiments of the invention only and not for the purpose of limiting the invention, FIGS. 1–3 illustrate a plurality of article feed mechanisms 10 disposed in side by side relationship and mounted on the frame of a press 12 so as to extend across bed 14 thereof. It will be appreciated of course that the press includes a slide, not shown, supported for reciprocation toward and away from bed 14, and that the slide is provided with tooling cooperable with tooling on bed 14 to perform work on a workpiece therebetween. Press 12 includes a center line 12a extending transverse to feed mechanisms 10, and bed 14 supports tooling designated generally by the numeral 16 which provides an upper surface 18 along which articles are transferred by mechanisms 10 from opposite sides of the press toward center line 12a as set forth more fully hereinafter. In the embodiment shown, press 12 is a crank driven press which, in a well known manner, includes a driven crank, not shown, for imparting reciprocating movement to the slide. As described hereinafter, feed mechanisms 10 are driven in coordination with reciprocating movement of the press slide and in this respect are preferably driven from the press crank. For the purpose of illustrating the preferred drive arrangement for the feed mechanisms, an end portion 20 of the crank shaft is illustrated in FIG. 2 of the drawing. Further details with regard to the structure and operation of the press drive arrangement are not necessary to an understanding of the present invention.

With further reference to FIGS. 1–3, feed mechanisms 10 are operable to transfer workpieces inwardly from opposite sides of the press toward axis 12a past corresponding sequentially arranged work stations A, B and C at each of which a different forming operation is performed on the workpiece. Workpieces, designated by the letter W, are suitably positioned at each end of the feed mechanism for step by step transfer along linear path P to each of the work stations, and during movement along path P the workpieces slide along surface 18 of the tooling on the press bed. In the embodiment shown, forming of a workpiece is completed at each of the stations C and the formed workpiece, designated W1, is suitably discharged downwardly to a corresponding conveyor 22 for discharge from the press. If, for example, the final working operation includes trimming of the workpiece, the feed mechanism can operate to transfer the scrap material S onto a conveyor 24 for removal from the press.

The foregoing general operation of feed mechanisms 10 will be better understood from the following detailed description of the structures of the feed mechanisms. The several feed mechanisms shown in FIGS. 1-3 are structurally identical and, accordingly, only one of the mechanisms will be described in detail. As will be seen in FIGS. 1-6, each feed mechanism 10 is comprised of a pair of bracket assemblies 26 mounted on opposite sides of press 12 and a feed bar assembly 28 extending across tooling 16 between the bracket assemblies. Each bracket assembly 26 includes a mounting bracket 30 and a support bracket 32 pivotally associated with the corresponding mounting bracket as set forth hereinafter. Each support bracket 32 includes an upper portion 34 disposed adjacent tooling surface 18 and carrying a feed bar support assembly 36. Each feed bar support assembly 36 supports the feed bars of the corresponding feed bar assembly 28 for longitudinal reciprocation along linear path P and for reciprocation laterally of path P. More particularly, each feed bar assembly 28 is comprised of a pair of parallel feed bar units 38 comprised of longitudinally aligned feed bar members 40 carrying inwardly directed feed fingers 42 in opposed pairs corresponding in number to the required number of step displacements of a workpiece. Longitudinally aligned ones of the feed bar members 40 are longitudinally slidably interengaged at their inner ends as set forth more fully hereinafter to enable the opposed feed bar members to reciprocate toward and away from one another during operation of the feed mechanism. In FIG. 1, feed bar units 38 are illustrated in the laterally outermost and longitudinally innermost positions thereof with respect to path P and press center line 12a. With this in mind, it will be appreciated that workpieces W are advanced one step from the position shown in FIG. 1 by displacing feed bar members 40 longitudinally toward the corresponding bracket assembly 26, displacing feed bar units 38 laterally inwardly for opposed feed fingers 42 to engage an article therebetween, displacing feed bar members 40 longitudinally inwardly of the press to move the articles to the next station, and then displacing feed bar units 38 laterally outwardly to the positions shown in FIG. 1 to release the articles.

Figure 4:
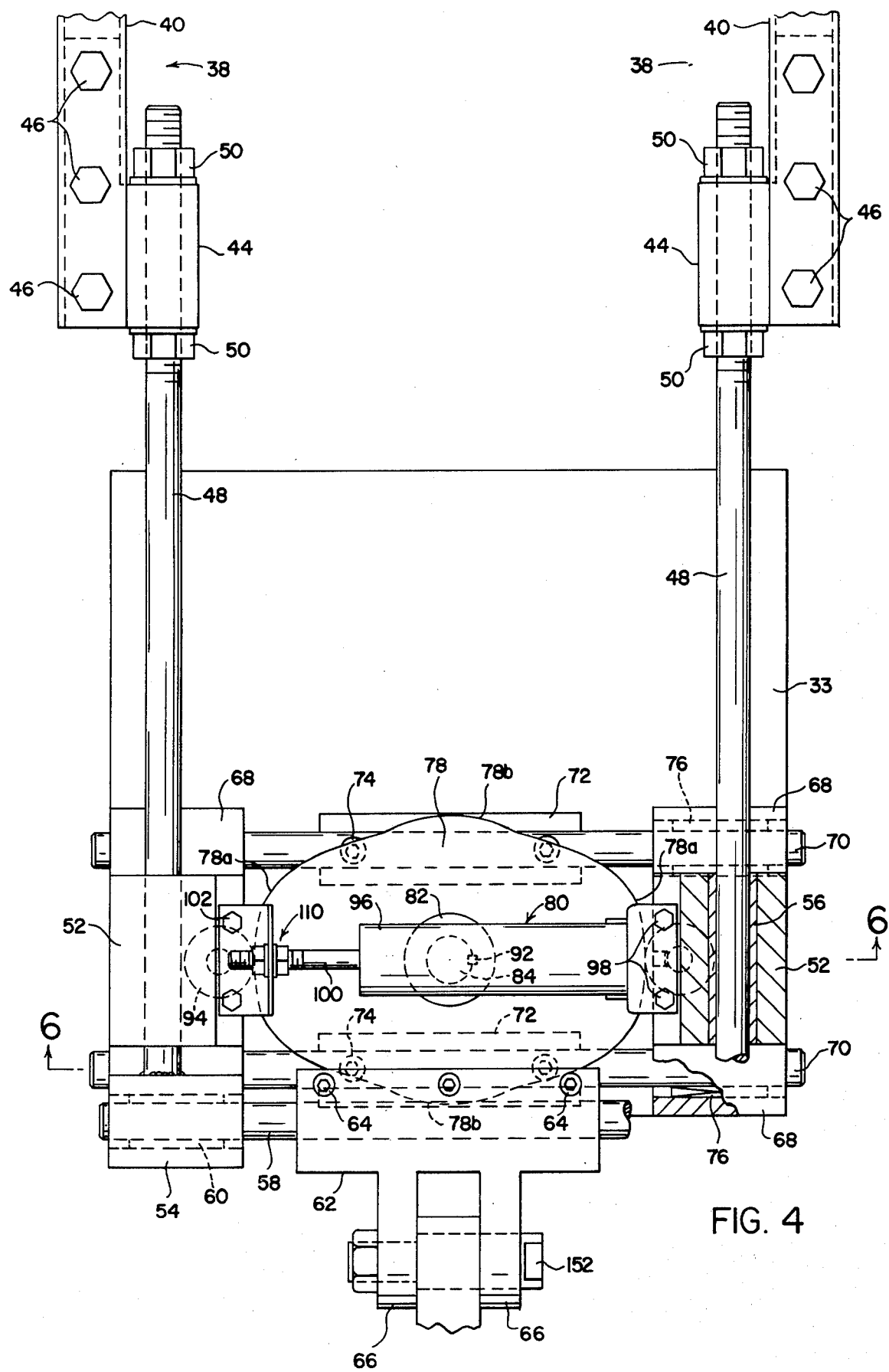
FIG. 4 is a detail plan view of a feed bar support assembly for the feed mechanism.
Figure 5:
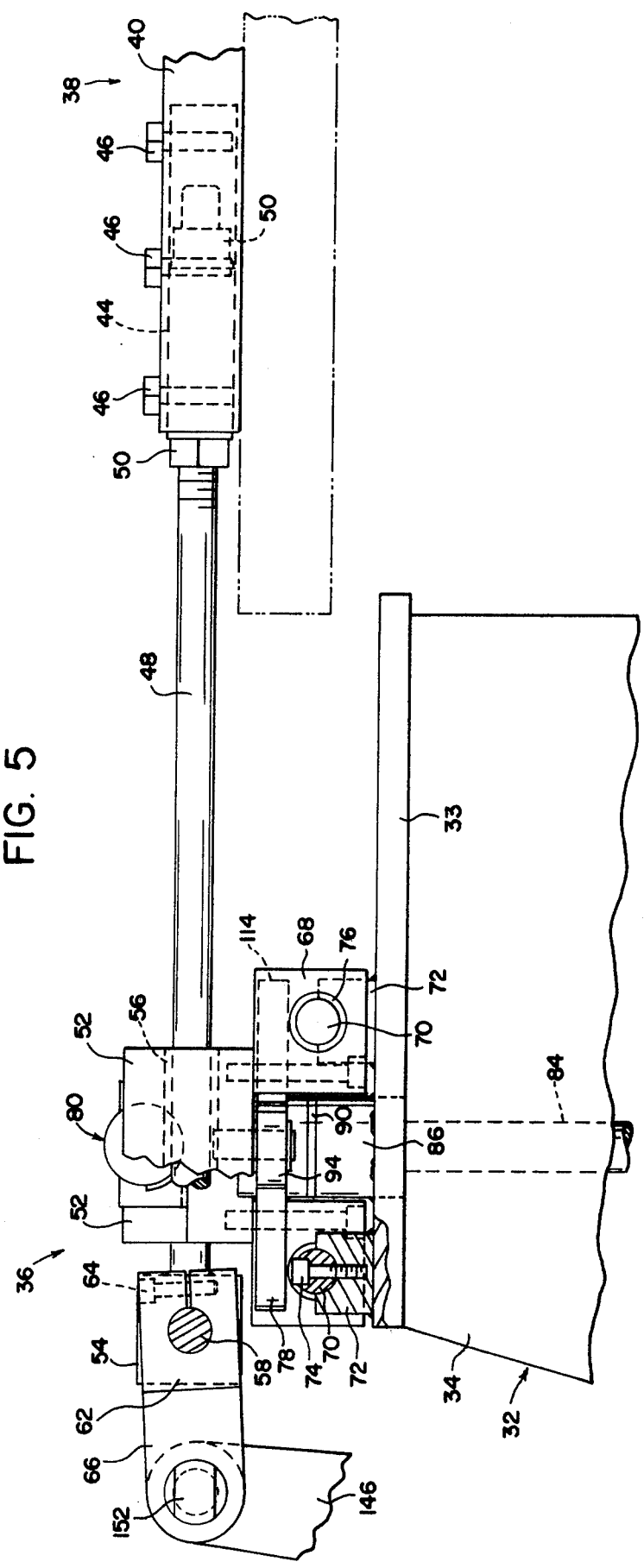
FIG. 5 is a detal side elevation view of the feed bar support assembly in FIG. 4.
Figure 6:
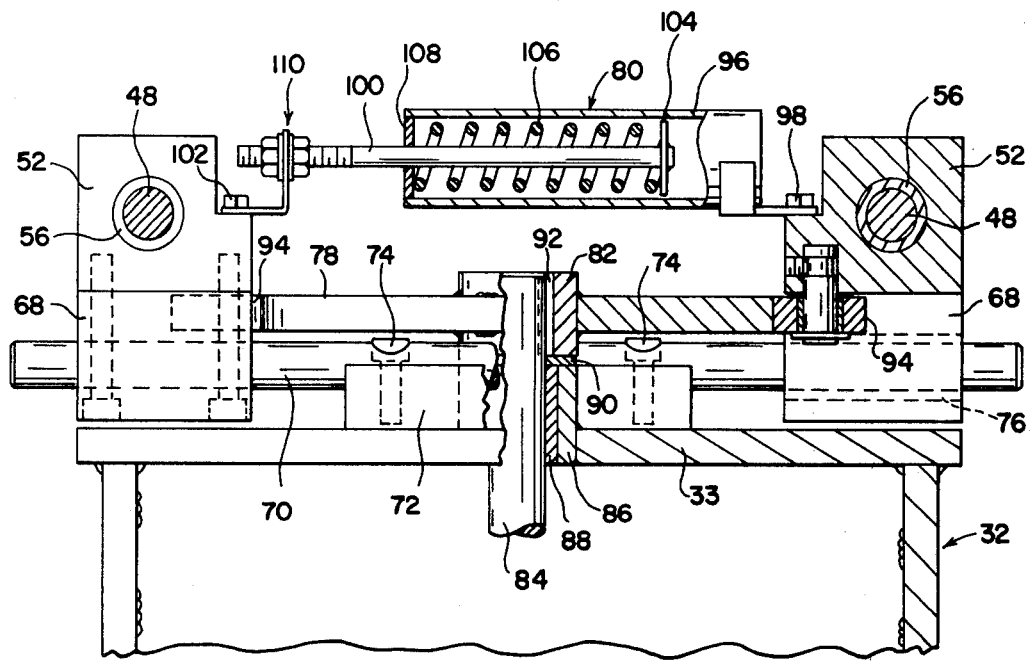
FIG. 6 is an end elevation view, partially in section, of the feed bar support assembly taken along line 6—6 in FIG. 4.

The manner in which longitudinal and lateral displacement of the feed bar members and units is achieved will be best understood with reference to FIGS. 4-9 which illustrate preferred structures for feed bar support assemblies 36 and the drive arrangement for the component parts thereof. Support assemblies 36 and the drive arrangements associated with each bracket assembly 26 are identical and, accordingly, only one such feed bar support assembly and drive arrangement is illustrated in FIGS. 4-9. With reference first to FIGS. 4-6, feed bar member 40 of each feed bar unit 38 is preferably a metal tube of square cross section receiving an L-shaped member 44 in the end thereof adjacent the corresponding feed bar support assembly 36, and which member 44 is suitably secured to tube 40 such as by a plurality of threaded fasteners 46. Each feed bar unit 38 further includes a rod member 48 having a threaded end extending freely through an opening in the corresponding member 44 and releaseably and adjustably interengaged with member 44 such as by means of a pair of nuts 50. It will be appreciated that this enables feed bar units 38 to be longitudinally adjusted relative to one another and to the corresponding feed bar support assembly 36. The other ends of rods 48 extend through openings in corresponding first support members 52 and are secured such as by welding to a corresponding feed bar head member 54. Preferably, a sleeve bearing 56 lines the opening through each member 52 to enhance sliding interengagement between rods 48 and support members 52. Feed bar head members 54 are slidably interengaged with a laterally extending drive rod 58 which extends through openings in the head members. Preferably, suitable bearings such as ball type bearing assemblies 60 are interposed between each head member and rod 58 to enhance sliding interengagement therebetween. A feed bar drive clamp 62 is tightly clamped on drive rod 58 such as by means of a plurality of threaded fasteners 64, and the drive clamp is provided with a pair of apertured fingers 66 by which the clamp and thus drive rod 58 is adapted to be reciprocated longitudinally as set forth hereinafter.

It will be appreciated that longitudinal reciprocation of clamp 62 imparts longitudinal reciprocation to both feed bar units 38 relative to support bracket 32 and first feed bar support members 52 which are longitudinally fixed with respect to the mounting bracket. More particularly, first feed bar support members 52 are each attached to a corresponding pair of support blocks 68 each of which is apertured to receive a corresponding laterally extending guide rod 70. Guide rods 70 are mounted on support bracket 32 by means of corresponding base blocks 72 which are welded or otherwise secured to a support plate component 33 of the mounting bracket. Each guide rod 70 is fastened to the corresponding block 72 by means of a plurality of threaded fasteners 74. Accordingly, it will be appreciated that guide rods 70 are longitudinally and laterally fixed with respect to support bracket 32, and that support blocks 68 and thus the corresponding first support members 52 are laterally reciprocable relative thereto. Preferably, suitable bearings such as ball type bearing assemblies 76 are interposed between guide rods 70 and the corresponding support blocks 72 to enhance the sliding engagement therebetween. It will be appreciated, therefore, that displacement of first support members 52 laterally with respect to support bracket 32 imparts lateral reciprocation to feed bar units 38, and that the sliding interengagement between feed bar rods 48 and support members 52 and the sliding interengagement between feed bar head members 54 and drive rod 58 enables longitudinal reciprocation of the feed bar units simultaneous with such lateral reciprocation.

Lateral reciprocation of support members 52 and thus feed bar units 38 is achieved by means of a rotatable cam 78 and a biasing assembly 80. Cam 78 is mounted on support plate 33 of support bracket 32 for rotation about a vertical axis. More particularly, cam 78 includes a hub 82 receiving a drive shaft 84 which is supported for rotation by means of a support sleeve 86 mounted on support plate 33. Preferably, bearing elements 88 and 90 are interposed between shaft 84 and sleeve 86 and between sleeve 86 and hub 82, respectively. Cam hub 82 is suitably secured to shaft 84 for rotation therewith such as by means of a key 92. A follower roller 94 is rotatably mounted on the under side of each of the support members 52 in alignment with cam 78, and biasing assembly 80 biases support members 52 and thus rollers 94 laterally inwardly against diametrically opposite sides of cam 78. In the embodiment shown, biasing assembly 80 includes a cylinder 96 attached by means of a bolt 98 to one of the support members 52, and a piston rod 100 attached to the other of the support members 52 by means of a bolt 102. The inner end of piston rod 100 is disposed within cylinder 96 and is provided with a washer or the like 104, and a compression spring 106 is interposed between washer 104 and end wall 108 of the cylinder to bias piston rod 100 inwardly of the cylinder and thus bias support members 52 laterally inwardly with respect to cam 78. Preferably, the outer end of piston rod 100 is provided with an adjustable mounting bracket arrangement 110 to facilitate adjusting the applied biasing force. Cam 78 has diametrically opposed major lobes 78a and diametrically opposed minor lobes 78b at right angles to lobes 78a. It will be appreciated that major lobes 78a provide the maximum lateral spread for feed bar units 38 and that minor lobes 78b provide the minimum separation for the feed bar units. Biasing assembly 80 maintains follower rollers 94 in engagement with the cam so as to return feed bar units 38 to the laterally inner positions thereof following movement thereof to the outermost positions by lobes 78a in response to rotation of cams 78. It will be further appreciated that the opposed pairs of identical cam lobes provide for the feed bar units to reciprocate outwardly and inwardly twice for each revolution of cam 78.

Figure 7:
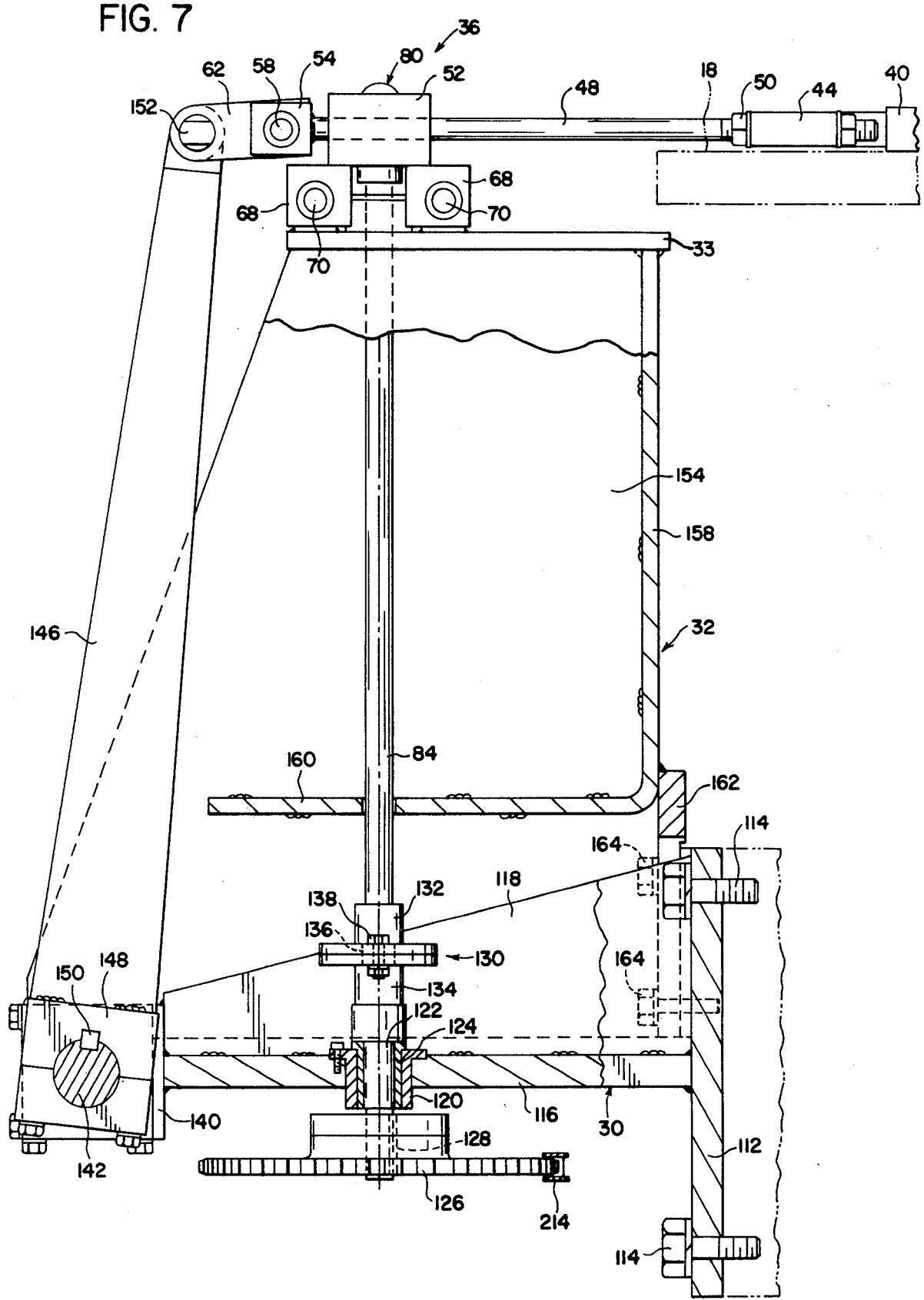
FIG. 7 is a detail elevation view, partially in section, of a mounting and support bracket assembly of a feed mechanism.
Figure 8:
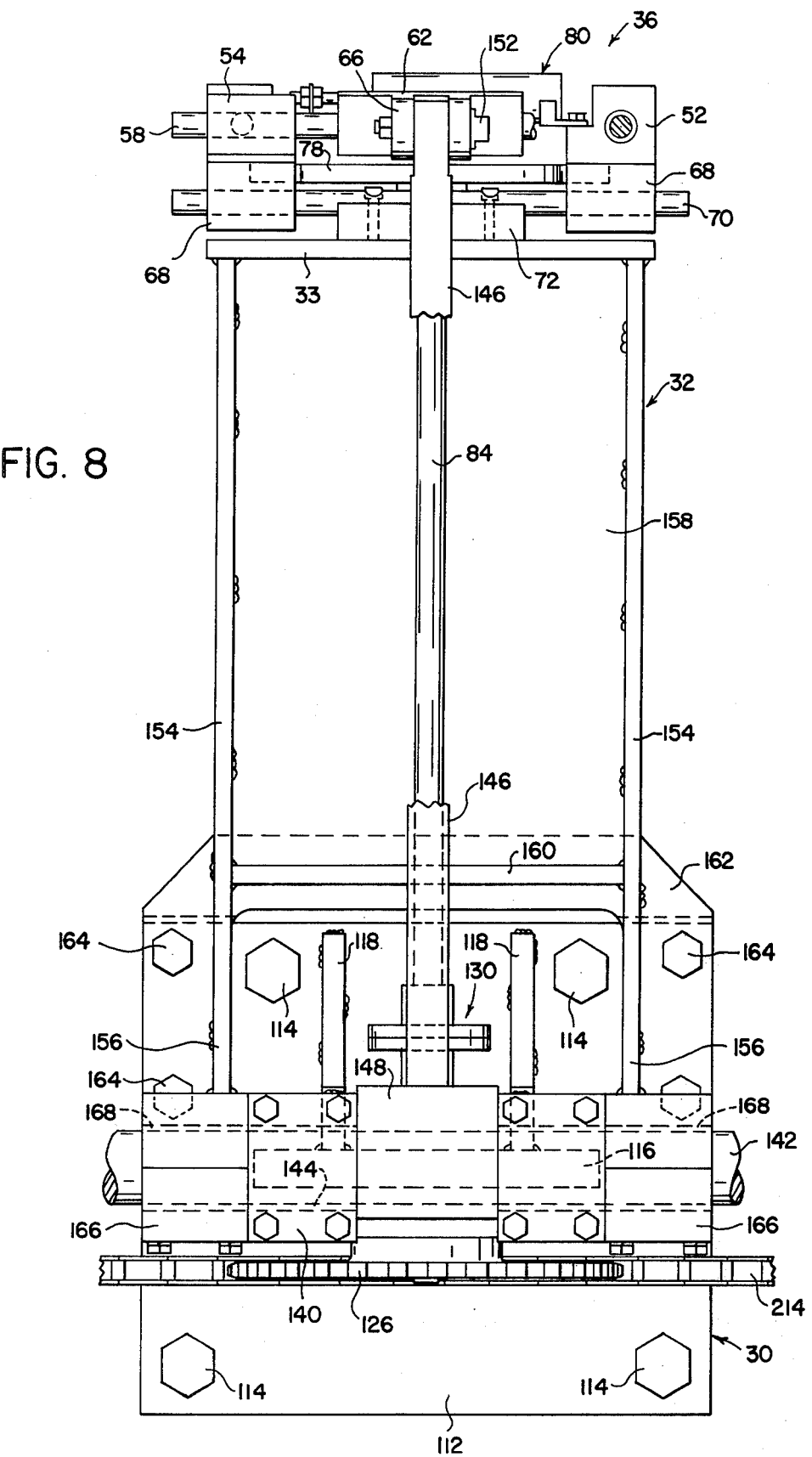
FIG. 8 is an end elevation view of the mounting and support bracket assembly in FIG. 7.
Figure 9:
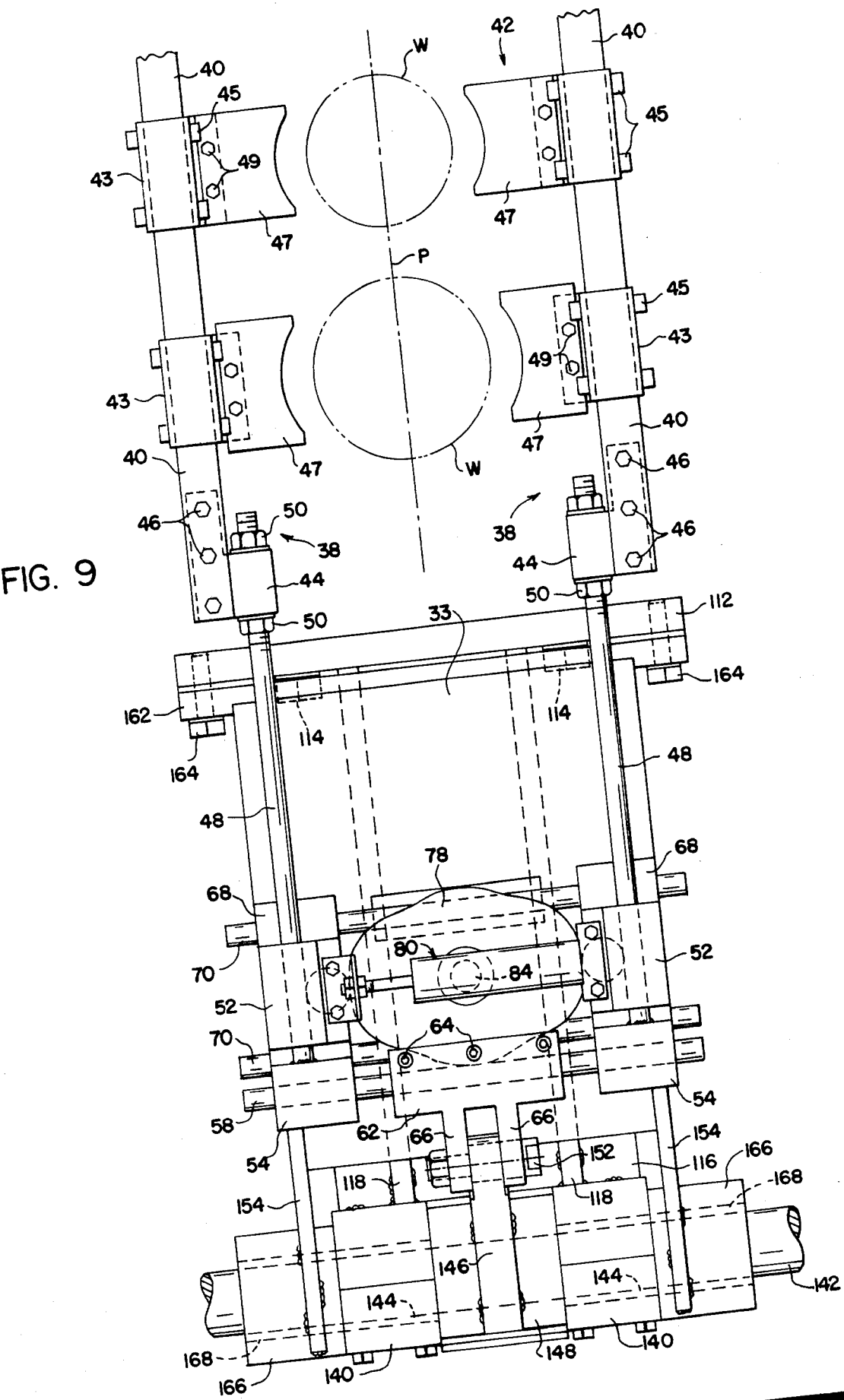
FIG. 9 is a plan view of the mounting and support bracket assembly shown in FIG. 7.

The manner in which cam 78 is rotated to achieve lateral reciprocation of the feed bar units, and the manner in which drive rod 58 is displaced to achieve longitudinal reciprocation of the feed bar units will be best understood with reference to FIGS. 7-9 of the drawing. In this respect, it will be seen in these Figures that mounting bracket 30 includes a mounting plate 112 fixedly secured to the press frame such as by means of a plurality of bolts 114, a horizontal support plate 116 welded or otherwise secured to mounting plate 112, and a pair of gusset plates 118 welded or otherwise secured to plates 112 and 116. Support plate 116 is provided with an opening aligned with shaft 84 and receiving a sleeve 120 adapted to support a shaft 112 for rotation relative to plate 116. Preferably, a bearing sleeve 124 is interposed between sleeve 120 and shaft 122, and a sprocket wheel 126 is mounted on the lower end of shaft 122 and drivingly interengaged therewith such as by means of a key 128. Shaft 122 and cam shaft 84 are interconnected by means of an adjustable coupling 130 comprised of an upper coupling member 132 keyed or otherwise secured to cam shaft 84 and a lower coupling member 134 keyed or otherwise secured to shaft 122. Coupling members 132 and 134 are provided with circumferentially extending and axially aligned slots 136 and are adjustably interconnected by means of a pair of nut and bolt assemblies 138. Accordingly, it will be appreciated that the rotational position of cam shaft 84 and thus cam 78 relative to driven shaft 122 can be adjusted by loosening nut and bolt assemblies 138 and rotating upper coupling member 132 relative to lower coupling member 34. Sprocket wheel 126 is adapted to be rotated as set forth hereinafter to rotate cam shaft 84 and thus cam 78 to achieve lateral reciprocation of feed bar units 38.

The outer end of support plate 116 of mounting bracket 30 is provided with a pair of bearing blocks 140 which are welded or otherwise secured to plate 116 and the corresponding one of the gusset plates 118. Bearing blocks 140 are apertured to receive and support a shaft 142 for pivotal movement relative to mounting bracket 30 and, preferably, suitable bearing sleeves 144 are interposed between bearing blocks 140 and shaft 142. A lever 146 is provided at its lower end with a hub 148 which is apertured to receive shaft 142 and which is interconnected with the shaft for pivotal movement therewith such as by means of a key 150. The upper end of lever 146 is received between fingers 66 of feed bar drive clamp 62 and is pivotally interconnected therewith by means of an eccentric pin 152. Additionally, it will be appreciated that oscillation of shaft 142 about its axis relative to mounting bracket 30 imparts longitudinal reciprocating movement to feed bar units 38.

In accordance with one aspect of the present invention, support bracket 32 is pivotally associated with mounting bracket 30 to enable displacement of the support bracket outwardly and downwardly relative to the press to facilitate access to the press tooling. In the embodiment shown, this is achieved by pivotally interconnecting support bracket 32 with shaft 142. More particularly, support bracket 32 includes a pair of side plates 154 having lower ends 156. Support bracket 32 further includes a connecting plate having a vertical portion 158 disposed between and welded to the back edges of side plates 154 and a horizontal portion 160 extending between and welded to side plates 154 intermediate the upper and lower ends thereof. A latching plate 162 is welded to vertical portion 158 of the connecting plate and overlies mounting plate 112 of mounting bracket 30. Latching plate 162 is releaseably interconnected with mounting plate 112 by means of a plurality of threaded fasteners 164. The lower outer ends of side plates 154 are welded or otherwise secured to corresponding bearing blocks 166 which are apertured to receive shaft 142. Preferably, bearing sleeves 168 are interposed between bearing blocks 166 and shaft 142. Accordingly, it will be appreciated that removal of fasteners 164 frees support bracket 32 for pivotal movement relative to shaft 142 in the counterclockwise direction from the position shown in FIG. 7. It will likewise be appreciated that removal of nut and bolt assemblies 138 from drive coupling 130 and disconnection of feed bar members 40 from rods 48 by removal of the outer ones of the nuts 50 on rods 48 permit pivotal movement of mounting bracket 32 and the corresponding feed bar support assembly 36, cam shaft 84 and lever 146, all as a unit, counterclockwise to the position shown in FIG. 2 by broken lines. Such pivotal movement is of course about the axis of shaft 142.

The manner in which sprocket wheel 126 is rotated and shaft 142 oscillated to achieve lateral and longitudinal reciprocation of feed bar units 38 will be best understood with reference to FIGS. 1-3 of the drawing. In this respect, one end of press 12 is provided with a pair of cam boxes 170 operable in a well known manner to transform rotary input motion to oscillatory output motion. Each of the cam boxes has a rotatable input shaft 172 and an oscillating output shaft 174 axially aligned with the corresponding shaft 142 for the feed mechanisms. Additionally, each of the cam boxes 170 includes a rotatable output shaft 176. In order to enable the use of identical cam boxes on opposite sides of the press as opposed to providing left and right hand boxes, a cam box identical to cam box 170 on the left hand side of FIG. 2 is merely inverted for use on the right hand side. Accordingly, input shaft 172 and output shaft 176 of the right hand cam box 170 in FIG. 2 are reversed with respect to the corresponding shafts of the left hand cam box. In the embodiment shown, input shafts 172 are provided with drum pulleys 178, and rotary input motion is achieved through corresponding belts 180 trained around drum pulleys 190. Pulleys 190 are adapted to be driven by the crank shaft of the press through a vertical drive shaft 192 and a gear box 194 having an input pulley 196 driven by a belt 198 trained around a drum pulley 200 driven by crank shaft 20 of the press. Gear box 194 has an input shaft 202 on which pulley 196 is mounted and an output shaft 204 connected to vertical drive shaft 192. It will be appreciated that gear box 194 transforms the rotary motion of horizontal input shaft 202 to rotary motion of the vertical output shaft 204.

Output shaft 176 of cam box 170 on the left hand side of the press as seen in FIG. 2 is provided with a drum pulley 206 which is connected by a belt 208 with a drum pulley 210 drivingly connected to a sprocket wheel 212 vertically aligned with sprocket wheels 126 on the corresponding ends of the several feed mechanisms 10. An endless sprocket chain 214 is trained about the several sprocket wheels 126, an idler wheel 216 at one end of the feed mechanisms, and an adjustable outer wheel 218 associated with sprocket wheel 212. Accordingly, rotation of output shaft 176 of the corresponding cam box 170 imparts rotation to all of the sprocket wheels 126 at the corresponding ends of the feed mechanisms, thus to rotate the corresponding cam 78 of each feed mechanism. In a similar manner, output shaft 176 of the right hand cam box 170 in FIG. 2 is provided with a drum pulley 220 which is connected by belt 222 with a drum pulley 224 drivingly associated with a sprocket wheel 226 disposed therebeneath and in vertical alignment with sprocket wheels 126 at the corresponding ends of feed mechanisms 10. An endless drive chain 228 is trained around sprocket wheels 126, an idler wheel 230, and an adjustable idler wheel 232 associated with sprocket wheel 226. Accordingly, rotation of output shaft 176 of the right hand cam box in FIG. 2 causes rotation of sprocket wheels 126 at the corresponding ends of the feed mechanisms and thus rotation of cam 78 of each feed mechanism. It will be appreciated that the cams are simultaneously driven at the same rotational speed and that the cams are positionally coordinated for the several sets of feed bar units 38 to reciprocate laterally, outwardly and inwardly at the same time.

As mentioned hereinabove, each of the cam boxes 170 has a corresponding oscillating output shaft 174, and each of the output shafts is drivingly coupled with the corresponding shaft 142 on which levers 146 of the several feed mechanisms are mounted. Preferably, each of the output shafts 174 and the corresponding shaft 142 are drivingly coupled through an overload slip-clutch 234 which advantageously allows output shaft 174 to oscillate relative to the corresponding shaft 142 in the event of a malfunction in any of the feed mechanisms which would restrain oscillating movement of the corresponding lever 146. Additionally, in the embodiment shown, slip-clutch 234 allows shaft 142 to pivot relative to output shaft 174 to facilitate pivotal movement of the levers 146 with mounting brackets 32 and the associated feed bar support assemblies 36 to the nonuse positions thereof as described hereinabove.

It will be appreciated that the oscillating motion of output shafts 174 of cam boxes 170 imparts oscillating movement to the levers 146 on the corresponding ends of the feed mechanisms to reciprocate feed bar units 38 longitudinally with respect to the path of article movement relative to the press. It will be further appreciated that in the present embodiment levers 146 at opposite ends of a given feed mechanism oscillate toward and away from one another to achieve simultaneous feeding of articles inwardly of the press from opposite sides thereof. This of course requires the axially aligned feed bar members 40 of each feed bar unit 38 to reciprocate longitudinally toward and away from one another. A suitable arrangement for interengaging feed bar members 40 to achieve such relative reciprocation is shown in FIGS. 10 and 11 of the drawing with respect to one of the feed bar units 38. In this respect, the opposed inner ends of tubular feed bar members 40 are interengaged by means of a circular rod 235 extending into the ends of members 40. One end of rod 235 is provided with a sleeve 236 and is axially fixed with respect to the corresponding feed bar member 40 by means of set screws 237 which extend through member 40 and sleeve 236 into engagement with rod 235. The portion of rod 235 extending into the other feed bar member 40 is supported for longitudinal sliding movement relative thereto by means of a bearing sleeve 238 which is attached to the corresponding feed bar member 40 by means of a pair of set screws 239. Rod 235 extends into the latter feed bar member 40 a distance sufficient to permit the required longitudinal separation between the ends of the feed bar members during longitudinal reciprocation of the feed bar members outwardly with respect to the corresponding side of the press.

FIGS. 10 and 11 further illustrate a suitable mounting arrangement for feed fingers 42 of the feed bar units. In this respect, each feed finger includes a mounting bracket 43 secured to the corresponding tubular feed bar member 40 by threaded fasteners 45, and a feed finger plate member 47 attached to bracket 43 by means of threaded fastener assemblies 49. As mentioned hereinabove, feed bar units 38 extend across surface 18 along which the articles are moved and, preferably, the feed bar members 40 are provided with suitable wear elements for engaging surface 18 to both support the feed bar units and to protect the latter and surface 18 from the eroding effect of reciprocation of the feed bar units relative to surface 18. Such wear protection can be provided, for example, by replaceable wear plugs 51 received in corresponding apertures in the wall of feed bar member 40 facing surface 18. The wear plug can be of any suitable material such as Delrin.

In FIGS. 1 and 2 of the drawing, levers 146 at opposite ends of each feed mechanism are in positions corresponding to maximum longitudinally inward displacement of the corresponding feed bar members 40 of feed bar units 38, and cams 78 are positioned with the major lobes disposed laterally thus to provide maximum spread between feed bar units 38. In these positions of the components, workpieces W have just been positioned and released at the several work stations by the feed mechanisms. The oscillating output shafts 174 of cam boxes 170 then operate to pivot the corresponding levers 146 in the direction to displace the corresponding feed bar members 40 longitudinally outwardly of the press, and cams 78 rotate 90° to position the minor lobes laterally, whereby feed bar units 38 are biased laterally inwardly toward one another for each set of feed fingers 42 to then engage the workpieces longitudinally behind the workpiece previously advanced by that set of feed fingers. Oscillating output shafts 174 then operate to pivot levers 146 in the direction to displace the corresponding feed bar members 40 longitudinally inwardly of the press to the positions shown in FIGS. 1 and 2, thus to advance the workpieces one step, and cam 78 rotates 90° to again position the major lobes in the position shown in FIG. 1 to laterally spread the feed bar units and thus release the workpieces. It will be appreciated, of course, that these movements are coordinated with movement of the press slide toward and away from the press bed, and that the drive of the cam boxes 170 is continuous with the drive of the press crank. It will be further appreciated that the sprocket wheel and chain drive arrangement for cams 78 provides for the cams 78 to be rotated one complete revolution for each two revolutions of the press crank so that each working stroke of the press slide provides 180° rotation of the cams to achieve the necessary single inward and outward displacement of the feed bar units for each article stepping operation of the feed mechanisms. In this respect, as mentioned hereinabove, the opposed major lobes and opposed minor lobes of the cam provide two laterally outward and inward motions of the feed bar units for each complete revolution of the cam.

While the embodiment just described advantageously enables the feed of articles simultaneously from opposite sides of the press toward the center thereof, it will be appreciated that feed bar units 38 could be continuous feed bar units between the bracket assemblies 26 and that the oscillating lever 146 at one end of the feed bar mechanism could be disconnected to enable the feed bar units to advance articles from one side of the pess to the other. With such an arrangement, the feed bar support assembly 36 at the end of the feed mechanism from which the lever is disconnected would serve to guide longitudinal reciprocation of the feed bar units, and the corresponding cam 78 would operate to laterally reciprocate the corresponding ends of the feed bar units in the manner described. Further, while it is preferred for simplicity of design and conservation of component parts to provide for oscillating shaft 142 to support mounting brackets 32 for pivotal movement and to also oscillate levers 146, it will be appreciated that a non-driven support shaft component located in the position of shaft 142 could interengage and support the levers and bracket assemblies in the manner shown, and that levers 146 could be pivotal relative to such shaft as opposed to being drivingly interengaged with the shaft. Levers 146 would then be suitably oscillated relative to the support shaft, such as by means of cams engaging the levers and mounted on a common shaft rotatably driven by the press output such as by a cam box or the like. Still further, while belt drives are shown between the press drive, cam boxes and sprocket wheels, and while sprocket chains are shown for driving the feed mechanism cams, it will be appreciated that chains could be employed where belts are shown and vice versa.

Figure 12:
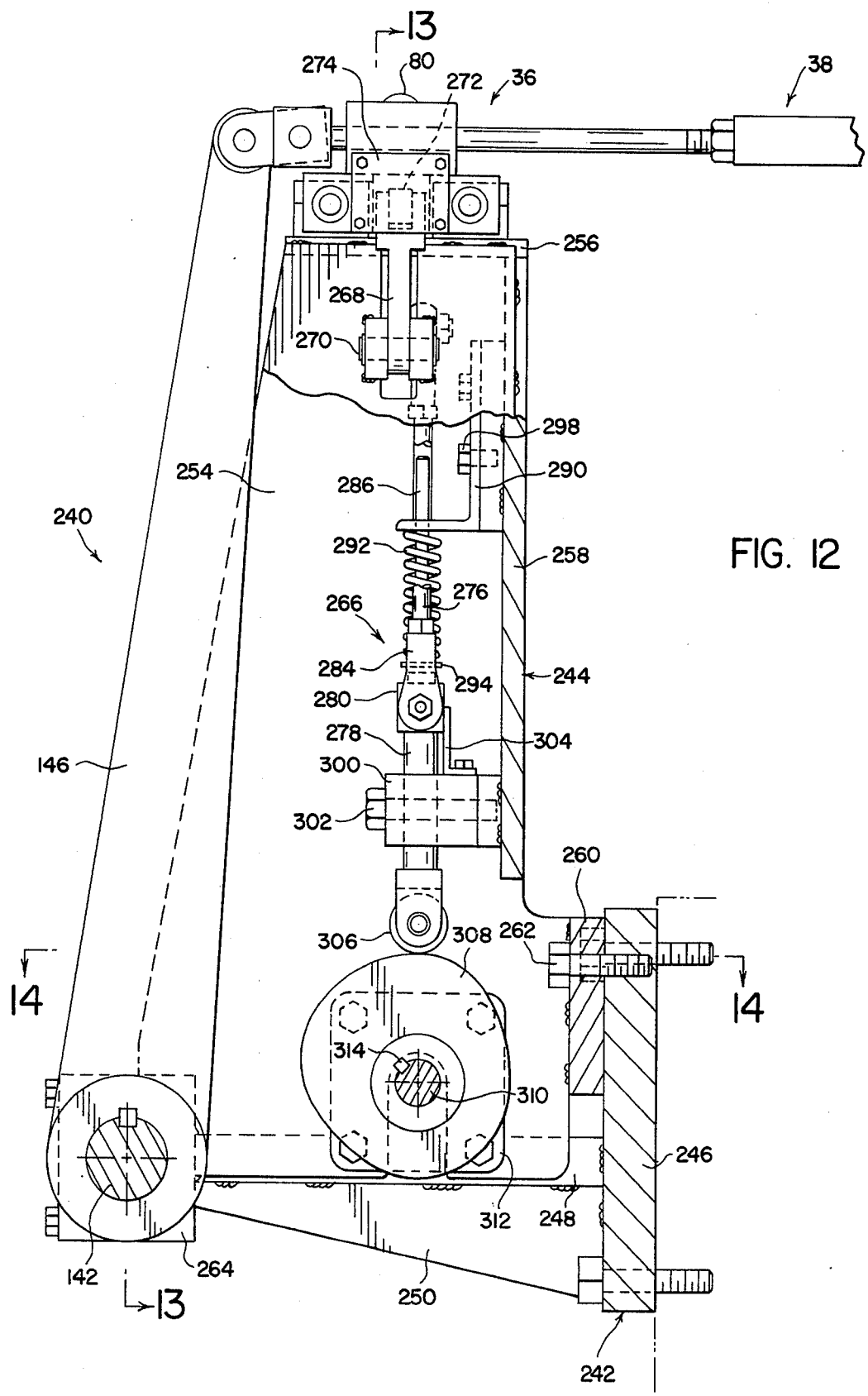
FIG. 12 is a detail side elevation view, partially in section, showing a modified bracket assembly and arrangement for laterally reciprocating the feed bar units of a feed mechanism.
Figure 13:
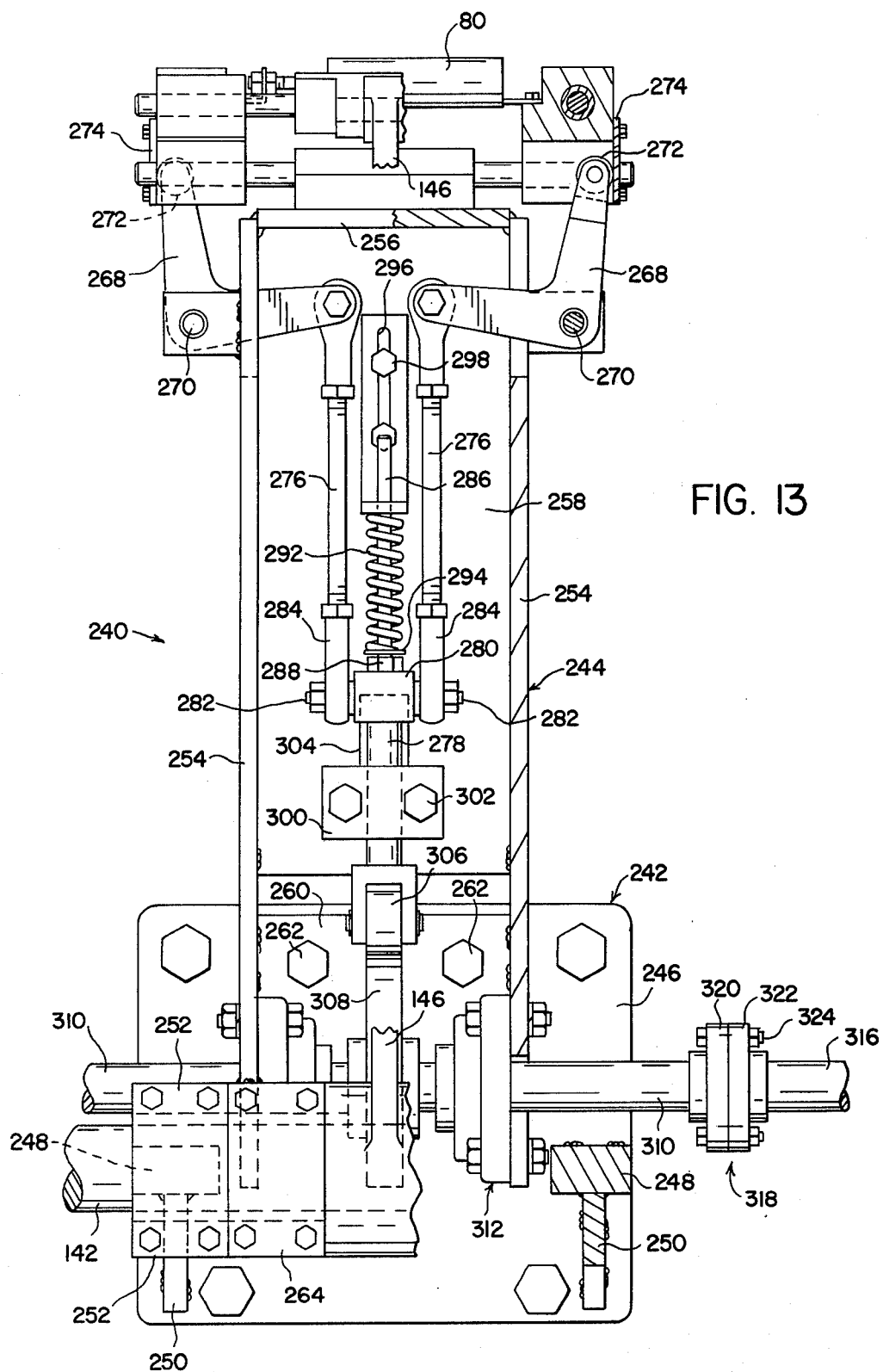
FIG. 13 is a detail end elevation view, partially in section, of the modified arrangement taken along line 13—13 in FIG. 12.
Figure 14:
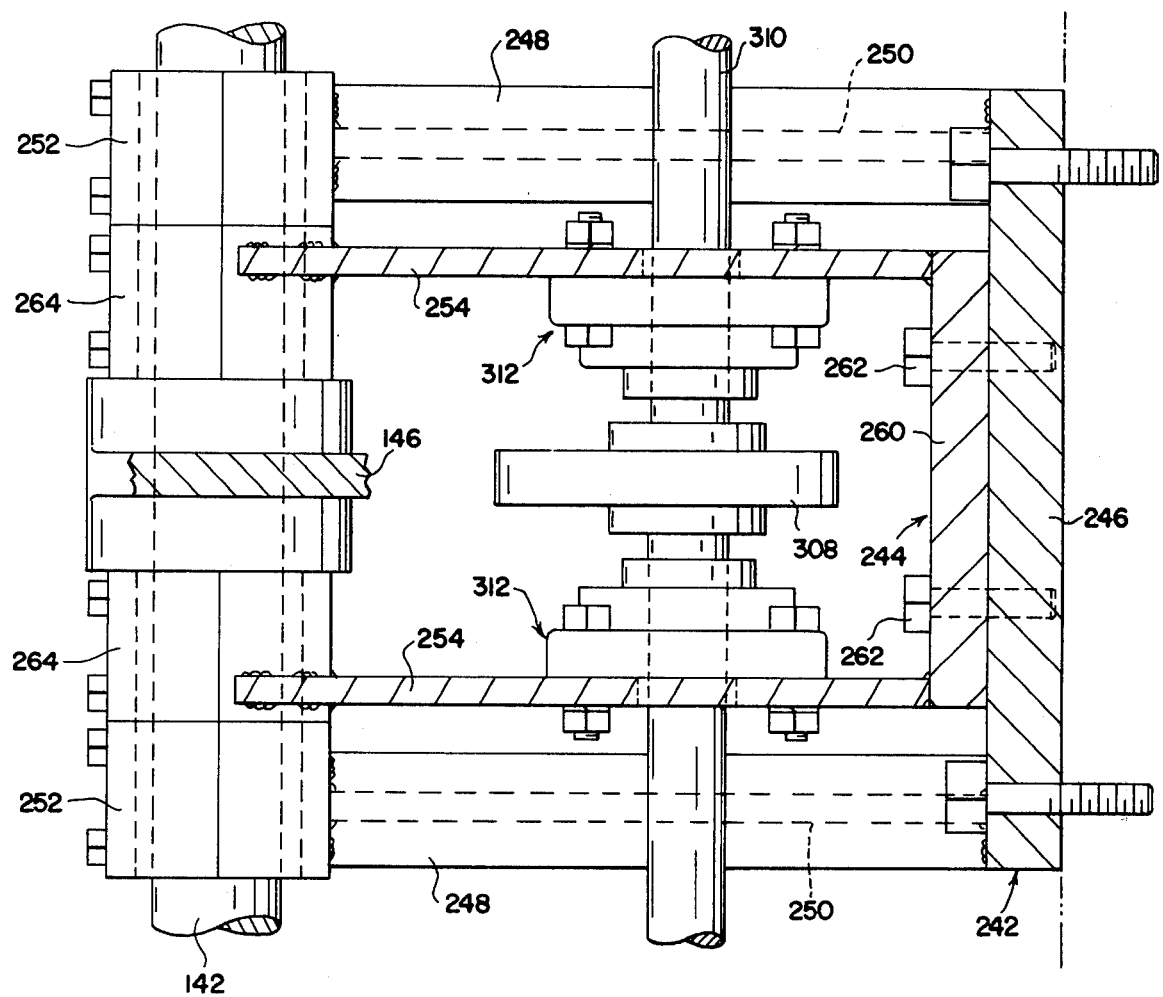
FIG. 14 is a plan view, in section, of the modified arrangement taken along line 14—14 in FIG. 12.

FIGS. 12-14 of the drawing illustrate a modified bracket assembly and drive arrangement for imparting lateral reciprocation to the feed bar units. Certain of the component parts in the modified assembly correspond to those described hereinabove in conjunction with the embodiment shown in FIGS. 1-11. Accordingly, like numerals are employed in FIGS. 12-14 to represent like components. Referring now to FIGS. 12-14, the modified bracket assembly 240 includes a mounting bracket portion 242 and a support bracket portion 244. Mounting bracket portion 242 is comprised of a back plate 246 and a pair of bottom plates 248 welded or otherwise secured to back plate 246 and extending horizontally therefrom. Corresponding gusset plates 250 are welded or otherwise secured to bottom plates 248 and back plate 246. A pair of journal blocks 252 are welded or otherwise secured to the outer ends of bottom plates 248 and receive and rotatably support oscillating shaft 142. Lever 146 includes a hub portion keyed or otherwise secured to shaft 142 for pivotal movement therewith. Support bracket 244 includes a pair of side plates 254, a top plate 256 and a back plate 258, all welded or otherwise suitably interconnected with one another. The support bracket further includes an abutment plate 260 welded or otherwise secured between side plates 254 and adapted to be releaseably connected to back plate 246 of the support brackets such as by means of a pair of threaded fasteners 262. The lower outer ends of side plates 254 are each provided with a bearing block 264 which rotatably receives shaft 142 and which enables support bracket 244 to pivot relative to shaft 142 as in the embodiment previously described.

Top plate 256 carries a feed bar support assembly 26 similar to that previously described and by which feed bar units 38 are supported for longitudinal and lateral reciprocation relative to the feed bar axis. In the present embodiment, however, lateral reciprocation of the feed bar support members and thus the feed bar units is achieved by means of a cam and lever assembly 266 mounted on the support bracket. The cam and lever assembly includes a pair of bell crank members 268 pivotally mounted on a corresponding one of the side plates 254 by means of a pin 270 for pivotal movement about horizontal axes parallel to the feed bar units. The upper end of each lever 268 is provided with a follower roller 272, and each of the first feed bar support members 52 is provided with a plate 274 engaged by the corresponding follower roller 272. The other end of each lever 268 is pivotally interconnected with a corresponding vertical drive rod 276, and the lower ends of rods 276 are connected to a common vertical rod 278 by means of a head 280 having outwardly extending pins 282 which extend through coupling 284 on rods 276. Vertical rod 278 includes a guide rod portion 286 extending upwardly therefrom through head 280, and head 280 is attached to rod 278 such as by means of a nut 288 threadedly received on extension 286.

Back plate 258 of support bracket 244 is provided with an L-shaped guide plate 290 which receives the upper end of rod portion 286, and a compression spring 292 is interposed between the horizontal leg of L-shaped plate 290 and a washer or the like 294 overlying nut 288. Preferably, plate 290 is mounted on back plate 258 for vertical adjustment relative thereto and, for this purpose, the vertical leg of plate 290 is provided with an elongated slot 296 receiving threaded fasteners 298 which enable a desired vertical adjustment. Spring 292 exerts a biasing force downwardly on rod 278, and the adjustment of L-shaped plate 290 facilitates adjusting the biasing force. Rod 278 is supported for vertical reciprocation by means of a suitable bearing block 300 which is apertured to receive rod 278 and which is attached to back plate 258 such as by means of threaded fasteners 302. An L-shaped guide plate 304 is attached to bearing block 300 and the vertical leg thereof slidably engages head 280 to restrain rotation of rod 278 about its axis. The lower end of rod 278 carries a follower roller 306 adapted to engage and ride on the peripheral surface of a rotatable cam 308 keyed or otherwise mounted on a shaft 310 which is rotatably supported relative to mounting bracket 244 by means of a pair of bearing block assemblies 312 bolted or otherwise secured on side plates 254. Cam 308 is disposed intermediate the bearing block assemblies and is suitably secured to shaft 310 such as by means of a key 314.

It will be appreciated that rotation of cam 308 displaces rod 278 and thus rods 276 upwardly against the bias of spring 292 and that spring 292 biases the rods downwardly during the appropriate portion of rotation of cam 308. It will be further appreciated that upward displacement of rods 278 and 276 pivots levers 268 about the axes of pins 270 in the direction to displace feed bar units 38 laterally outwardly with respect to one another, and that downward displacement of the rods pivots levers 268 in the direction enabling the feed bar units to reciprocate laterally inwardly relative to one another under the biasing influence of biasing unit 80 described hereinabove. In connection with the modified structure of the present embodiment, oscillating shaft 142 would be driven in the manner of shaft 142 illustrated in FIGS. 1-3 of the drawing. Shafts 310 at each of the opposite ends of the feed mechanism would replace the sprocket wheel and chain type drive shown in the latter Figures, and shafts 310 would be rotated by suitable connection with a rotating output shaft of cam boxes 170. As shown in FIG. 13, such a rotatable output shaft is designated by the numeral 316 and is coupled with the corresponding end of shaft 310 by means of a suitable disconnectable coupling 318 which could, for example, be structurally equivalent to coupling 130 shown in FIG. 7. In this respect, coupling 318 includes a member 320 attached to shaft 310 and a member 322 attached to shaft 316, and coupling members 320 and 322 are interconnected such as by means of nut and bolt assemblies 324. Thus, by removing nut and bolt assemblies 324 shaft 310, which is common to all of the feed mechanisms on the corresponding side of the press, is free to pivot with support brackets 244 relative to the axis of shaft 142 to enable displacement of the support bracket, feed bar support assembly 36 and lever 146 to a non-use position as described in connection with the embodiment shown in FIGS. 1-11.

Figure 15:
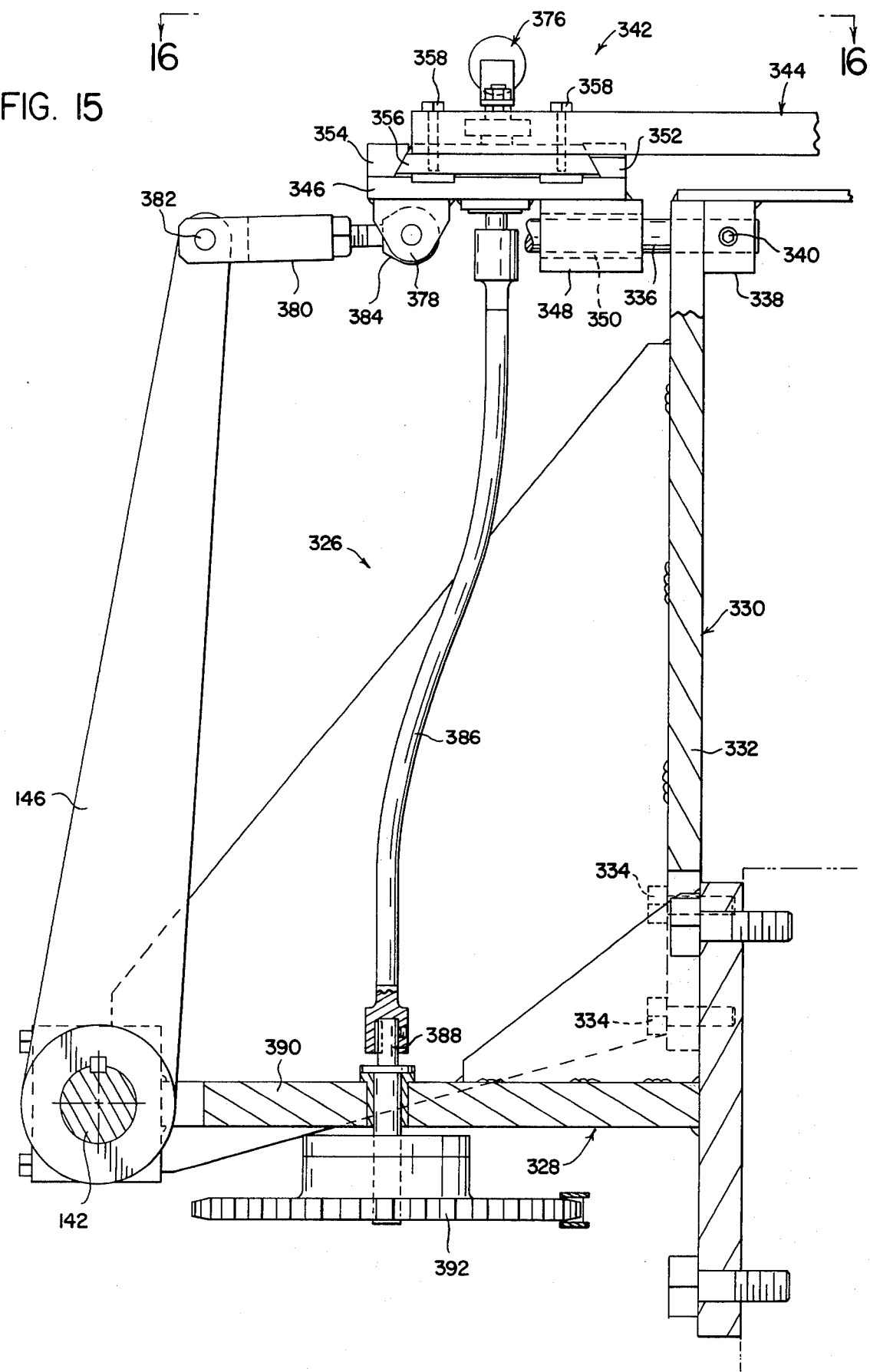
FIG. 15 is a side elevation view, partially in section, showing another modification of the feed bar support assembly and drive therefor.
Figure 16:
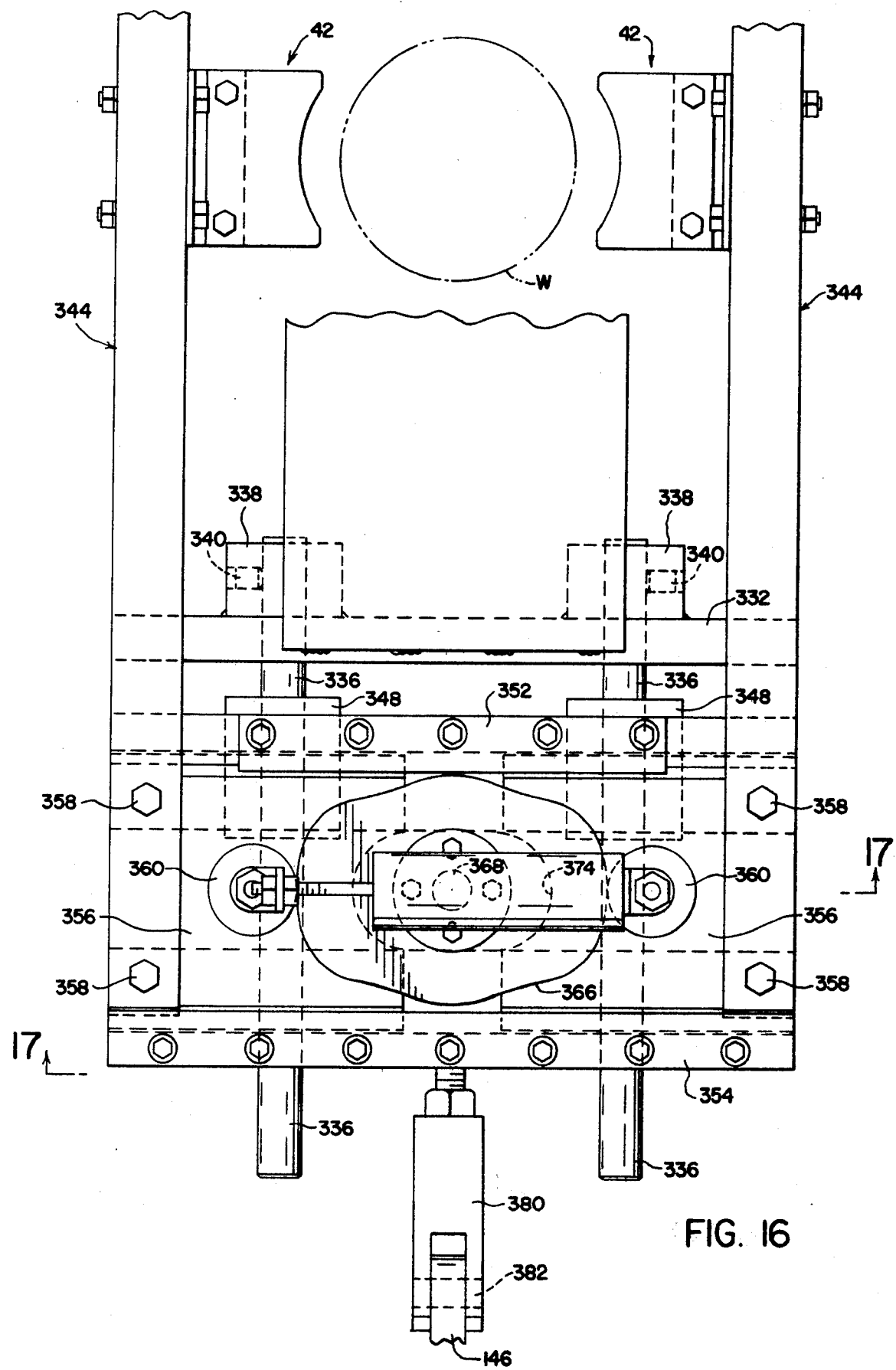
FIG. 16 is a plan view of the modified assembly taken along line 16—16 in FIG. 15; and, FIG. 17 is an end elevation view of the assembly, partially in section, taken along line 17—17 in FIG. 16.
Figure 17:
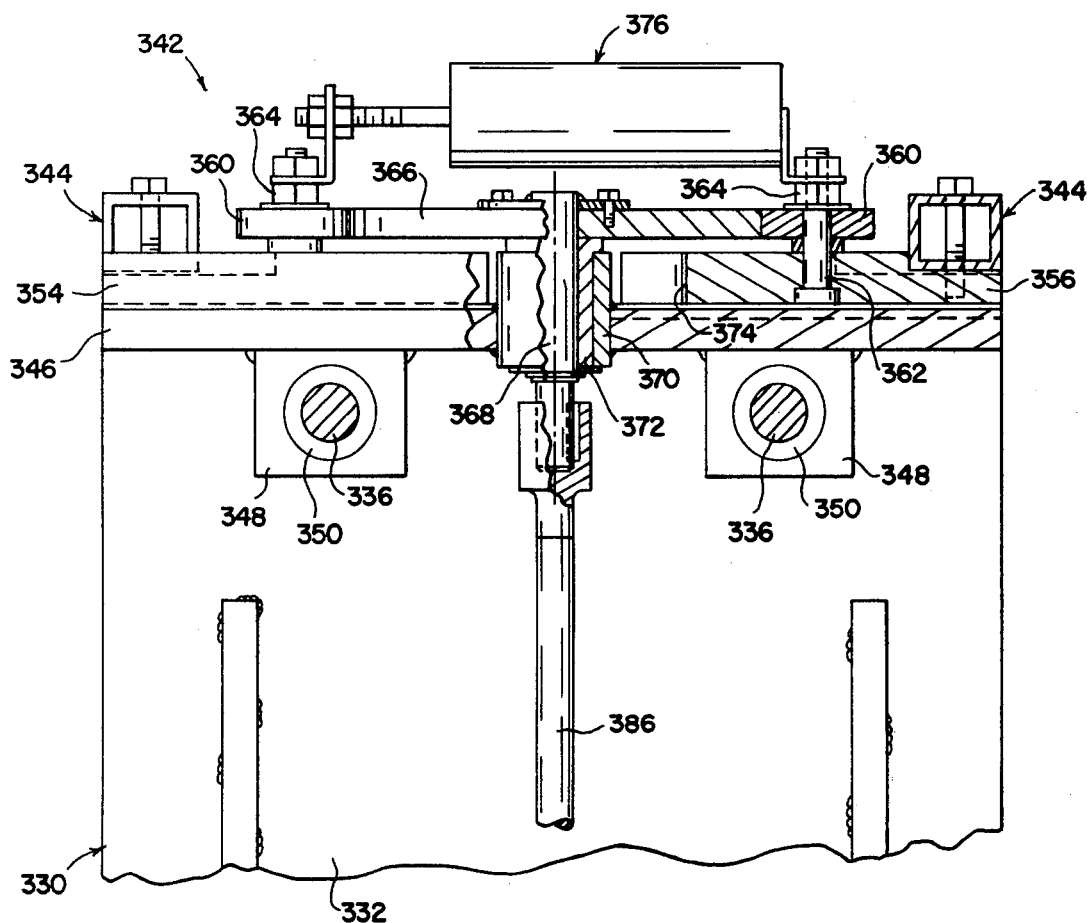

FIGS. 15-17 illustrate another embodiment of a feed bar support unit and drive therefor. Certain of the component parts shown in FIGS. 15-17 are identical to those in the embodiment of FIGS. 1-11 and, accordingly, are identified by corresponding numerals. Referring now to FIGS. 15-17, a bracket assembly 326 is shown comprising a mounting bracket 328 and a support bracket 330. In a manner similar to that described in connection with the embodiment of FIGS. 1-11, oscillating shaft 142 is supported at the outer end of mounting bracket 328 and the lower outer end of support bracket 330 is structurally interengaged with shaft 142 to enable pivotal movement of the mounting bracket about the shaft axis. Further, lever 146 is keyed or otherwise mounted on shaft 142 for oscillating movement therewith. Support bracket 330 includes a back plate 332 adapted to be releasably interconnected with the mounting plate by means of threaded fasteners 334, and the upper end of back plate 330 is provided with a pair of parallel laterally spaced apart support rods 336 attached to the back plate by means of corresponding mounting blocks 338 and releaseable fasteners 340. Support rods 336 extend outwardly of the back plate and slidably support a feed bar support assembly 342 which supports a pair of feed bar units 344 for longitudinal and lateral reciprocation relative to a support bracket.

Feed bar support assembly 342 includes a base plate 346

Feed bar support assembly 342 includes a base plate 346 provided on its underside with a pair of bearing sleeves 348 each receiving a corresponding one of the guide rods 336. Preferably, ball-type bearing assemblies 350 are interposed between each bearing sleeve and the corresponding rod 336 to enhance the sliding interengagement therebetween, and it will be appreciated that the bearing sleeves support base plate 346 and thus feed bar assembly 342 for longitudinal reciprocation relative to support bracket 330. Base plate 346 is provided on its upper side with front and rear gib bars 352 and 354, respectively, which slidably support a pair of laterally reciprocable slide members 356. The corresponding ends of feed bar units 344 are attached to the upper surface of a corresponding one of the slide members 356 such as by means of bolts 358, and each of the slide members is provided with a follower roller 360 mounted thereon by means of a pin 362 extending through the slide member and provided with a suitable nut 364 on the outer end thereof.

A cam 366 is mounted on a driven shaft 368 which is supported for rotation by base plate 346 through a support sleeve 370 mounted on the base plate and an interposed bearing 372. The inner ends of slide members 356 are provided with laterally inwardly opening recesses 374 to permit the necessary lateral displacement of the slides without interference with sleeve 370. Cam 366 in a manner similar to cam 78 of the embodiment shown in FIGS. 1-11 has opposed major and minor lobes to enable lateral reciprocation of slide members 356 and thus feed bar units 344 twice for each complete revolution of the cam. A biasing assembly 376 similar, for example, to biasing assembly 80 in the embodiment of FIGS. 1-11, is provided between slide members 356 to bias the latter inwardly relative to cam 366. In this embodiment, biasing assembly 376 is mounted on the upper ends of pins 362 of rollers 360. The underside of base plate 346 is provided with a pair of depending plate members 378 and the upper end of lever 146 is pivotally interconnected therewith by means of a link 380 having one end interconnected with lever 146 such as by means of a pin 382 and having its opposite end interconnected with plates 378 such as by means of an adjustable eye fastener 384 threadedly interengaged with link 380. Thus, it will be appreciated that oscillating movement of lever 146 imparts reciprocating movement to feed bar support assembly 342, including slide members 356 and 366, and that rotation of cam 366 imparts lateral reciprocation to the feed bar units relative to base plate 346 of assembly 342.

In order to enable longitudinal reciprocation of the feed bar support unit, cam shaft 368 is rotated through a flexible drive shaft 386 having its upper end coupled with shaft 368 in driving relationship therewith and having its lower end coupled with a drivable shaft 388 supported for rotation by the bottom plate 390 of support bracket 328. Shaft 388 extends beneath plate 390, and a sprocket wheel 392 is keyed or otherwise attached to shaft 388 so as to drive the latter and thus rotate cam 366 in response to rotation of sprocket wheel 392. Sprocket wheel 392 is adapted to be driven in the manner of sprocket wheels 126 described herein in conjunction with the embodiment shown in FIGS. 1-11. While shaft 386 is shown as a flexible drive shaft, it will be appreciated that this shaft could be defined by telescoping rigid shaft components which are longitudinally slidable relative to one another and interengaged against relative rotation and each of which components would be coupled to a corresponding one of the shafts 378 and 388 by universal type driving couplings.

While considerable emphasis has been placed herein on preferred embodiments of the invention and the specific structures and structural interrelationships of the component parts thereof, it will be readily apparent that many embodiments of the invention can be made and that many changes can be made in the embodiments herein illustrated and described without departing from the principles of the invention. Accordingly, it is to be distinctly understood that the foregoing descriptive matter is to be interpreted merely as illustrative of the invention and not as a limitation.

Having thus described the invention, it is claimed:

1. An article feed mechanism mountable on a machine for transferring articles along a linear path relative to work stations of the machine comprising, a pair of parallel feed bar units extending in the direction of said path and having opposite ends, and support and drive means at said opposite ends supporting said feed bar units for longitudinal and lateral reciprocation with respect to the direction of said path, said support and drive means including first support and drive means at one of said opposite ends comprising bracket means having upper and lower portions, feed bar unit support means on the upper portion of said bracket means supporting said feed bar units for longitudinal and lateral reciprocation relative to said bracket means, said feed bar unit support means including first support member means laterally reciprocable relative to said bracket means and second support member means longitudinally reciprocable relative to said bracket means and drivingly interconnected with the corresponding ends of said feed bar units, shaft means extending between said upper and lower portions of said bracket means, means supporting said shaft means for displacement relative to said bracket means, means interconnecting said shaft means and said first support member means to laterally reciprocate said first support member means in response to displacement of said shaft means, means to displace said shaft means, oscillating lever means, means supporting said oscillating lever means for oscillation about a first axis through the lower portion of said bracket means, said oscillating lever means having an end spaced from said first axis and interconnected with said second support member means to longitudinally reciprocate said second support member means in response to oscillation of said lever means, means to oscillate said lever means, said bracket means including a mounting bracket and a support bracket, said support bracket carrying said feed bar support means and being supported for pivotal movement relative to said mounting bracket by means including said means supporting said oscillating lever means, and means releasably holding said support bracket against pivotal movement relative to said mounting bracket.

2. The article feed mechanism according to claim 1, wherein said shaft means is supported for rotational displacement relative to said bracket means and said means interconnecting said shaft means and first support member means is cam means rotatable with said shaft means.

3. The article feed mechanism according to claim 1, wherein said shaft means is supported for reciprocable displacement and said means interconnecting said shaft means and first support member means is second lever means pivotally mounted on said bracket means and pivoted in response to reciprocation of said shaft means.

4. The article feed mechanism according to claim 1, wherein said support and drive means at said opposite ends of said feed bar units includes second support and drive means at the other of said opposite ends of said feed bar units, said second support and drive means corresponding structurally with said first support and drive means.

5. An article feed mechanism mountable on a machine for transferring articles along a linear path relative to work stations of the machine comprising, a pair of parallel feed bar units extending in the direction of said path and having opposite ends, and support and drive means at said opposite ends supporting said feed bar units for longitudinal and lateral reciprocation with respect to the direction of said path, said support and drive means including first support and drive means at one of said opposite ends comprising bracket means having upper and lower portions, feed bar unit support means on the upper portion of said bracket means supporting said feed bar units for longitudinal and lateral reciprocation relative to said bracket means, said feed bar unit support means including first support member means laterally reciprocable relative to said bracket means and second support member means longitudinally reciprocable relative to said bracket means and drivingly interconnected with the corresponding ends of said feed bar units, shaft means extending between said upper and lower portions of said bracket means, means supporting said shaft means for displacement relative to said bracket means, means interconnecting said shaft means and said first support member means to laterally reciprocate said first support member means in response to displacement of said shaft means, means to displace said shaft means, oscillating lever means, means supporting said oscillating lever means for oscillation about a first axis through the lower portion of said bracket means, said oscillating lever means having an end spaced from said first axis and interconnected with said second support member means to longitudinally reciprocate said second support member means in response to oscillation of said lever means, means to oscillate said lever means, said support and drive means at said opposite ends of said feed bar units including second support and drive means at the other of said opposite ends of said feed bar units, said second support and drive means corresponding structurally with said first support and drive means, each feed bar unit of said pair including separate longitudinally aligned first and second portions between said opposite ends thereof, and means longitudinally slidably interconnecting said first and second portions of each feed bar unit to enable relative longitudinal reciprocation between said first and second portions.

6. An article feed mechanism mountable on a machine for transferring articles along a linear path relative to work stations of the machine comprising, a pair of parallel feed bar units extending in the direction of said path and having opposite ends, and support and drive means at said opposite ends supporting said feed bar units for longitudinal and lateral reciprocation with respect to the direction of said path, said support and drive means including first support and drive means at one of said opposite ends comprising bracket means having upper and lower portions, feed bar unit support means on the upper portion of said bracket means supporting said feed bar units for longitudinal and lateral reciprocation relative to said bracket means, said feed bar unit support means including first support member means laterally reciprocable relative to said bracket means and second support member means longitudinally reciprocable relative to said bracket means and drivingly interconnected with the corresponding ends of said feed bar units, shaft means extending between said upper and lower portions of said bracket means, means supporting said shaft means for displacement relative to said bracket means, means interconnecting said shaft means and said first support member means to laterally reciprocate said first support member means in response to displacement of said shaft means, means to displace said shaft means, oscillating lever means, means supporting said oscillating lever means for oscillation about a first axis through the lower portion of said bracket means, said oscillating lever means having an end spaced from said first axis and interconnected with said second support member means to longitudinally reciprocate said second support member means in response to oscillation of said lever means, means to oscillate said level means, said support and drive means at said opposite ends of said feed bar units including second support and drive means at the other of said opposite ends of said feed bar units, said second support and drive means corresponding structurally with said first support and drive means, each said bracket means of said first and second support and drive means at said one and other ends of said feed bar units including a mounting bracket and a support bracket, said support bracket carrying the corresponding one of said feed bar support means and being supported for pivotal movement relative to the corresponding mounting bracket by means including the corresponding one of said means pivotally supporting said oscillating lever means, and means releasably holding each said support bracket against pivotal movement relative to the corresponding mounting bracket.

7. The article feed mechanism according to claim 6, wherein each said shaft means of said first and second support and drive means is supported for rotational displacement relative to the corresponding bracket means, said means interconnecting said shaft means and first support member means being cam means rotatable with the corresponding shaft means, and said means to displace said shaft means including a drivable member rotatably supported by the corresponding mounting bracket and means releasably coupling said drivable member and said shaft means.

8. The article feed mechanism according to claim 7, wherein said coupling means is adjustable to enable rotational adjustment of said cam means relative to the corresponding first support member means.

9. The article feed mechanism according to claim 6, wherein each said shaft means of said first and second support and drive means is supported for reciprocable displacement relative to the corresponding bracket means, said means interconnecting said shaft means and first support member means being second lever means pivotally mounted on the corresponding support bracket and pivotal in response to reciprocation of said shaft means, and said means to displace said shaft means including cam means rotatably supported by the corresponding mounting bracket and drivingly engaging said shaft means.

10. The article feed mechanism according to claim 6, wherein each feed bar unit of said pair includes separate longitudinally aligned first and second portions between said opposite ends thereof, and means longitudinally slidably interconnecting said first and second portions of each feed bar unit to enable relative longitudinal reciprocation between said first and second positions.

11. An article feed mechanism mountable on a press frame for transferring articles on a supporting surface and along a linear path relative to work stations of the press comprising, a first pair of bracket assemblies spaced apart in the direction of said path, a first pair of parallel feed bar units extending along said path between said bracket assemblies and having ends, each said bracket assembly including a mounting bracket and a support bracket, said support bracket including first and second ends, feed bar unit support means mounted on said first end and supporting the corresponding ends of said first pair of feed bar units, said feed bar unit support means including first and second support member means respectively reciprocable relative to said support bracket laterally and longitudinally with respect to said path, first drive means including first shaft means carried by said support bracket and displacable relative thereto to reciprocate said first support member means, second drive means including oscillating lever means having an end connected to said second support member means and supported for oscillation about an axis adjacent said second end of said support bracket to reciprocate said second support member means, means interconnecting said support bracket and said lever means with said mounting bracket for pivotal movement of said support bracket, said feed bar unit support means, said first shaft means and said lever means as a unit relative to said mounting bracket about said axis and between first and second positions, said first end of said support bracket in said first position being adjacent said press frame and the plane of said support surface and in said second positions being spaced from said frame and below said plane, and means releasably holding said support bracket in said first position.

12. The article feed mechanism according to claim 11, wherein said means interconnecting said support bracket and said lever means with said mounting bracket includes a second shaft means pivotally supported by said mounting bracket, said lever means being mounted on said second shaft means for pivotal movement therewith, said support bracket being interconnected with said second shaft means for pivotal movement relative thereto, and said second drive means including means to oscillate said second shaft means and thus said lever means.

13. The article feed mechanism according to claim 12, wherein said first shaft means is rotatable relative to said support bracket and said first drive means includes driven wheel means for rotating said first shaft means, said wheel means being mounted on said mounting bracket, and means releasably coupling said wheel means and said first shaft means.

14. The article feed mechanism according to claim 13, wherein said first drive means further includes cam means on said first shaft means for reciprocating said first support member means in response to rotation of said first shaft means.

15. The article feed mechanism according to claim 14, wherein said coupling means is adjustable to adjust the position of said first shaft means relative to said wheel means and thus adjust the position of said cam means relative to said first support member means.

16. The article feed mechanism according to claim 12, wherein said first shaft means is reciprocable relative to said support bracket and said first drive means includes driven cam means rotatably supported by said mounting bracket and drivingly engaging said first shaft means to reciprocate said first shaft means in response to rotation of said driven cam means.

17. The article feed mechanism according to claim 16, wherein said first drive means further includes drive lever means pivotally mounted on said support bracket and pivoted in response to reciprocation of said first shaft means to reciprocate said first support member means.

18. The article feed mechanism according to claim 12, and at least a second pair of said bracket assemblies and a second pair of said feed bar units therebetween, said first and second pairs of bracket assemblies and feed bar units being disposed in side by side parallel relationship, said second shaft means being common to the laterally adjacent ones of said bracket assemblies, said first drive means including common drive means for said first shaft means of said laterally adjacent bracket assemblies.

19. The article feed mechanism according to claim 18, wherein said first shaft means is rotatable and said first drive means further includes driven wheel means mounted on each said mounting brackets for rotation about a vertical axis and means coupling said wheel means with the corresponding first shaft means, and said common drive means includes driven endless belt means interengaging said wheel means.

20. The article feed mechanism according to claim 18, wherein said first shaft means is reciprocable and said common drive means includes common cam shaft means parallel to said second shaft means and supported for rotation by laterally adjacent ones of said mounting brackets, and a cam on said cam shaft means for each said first shaft means.

21. An article feed mechanism mountable on a machine for transferring articles along a linear path relative to work stations of the machine comprising, a pair of parallel feed bars extending in the direction of said path and having opposite ends, and support and drive means at said opposite ends of said feed bars, said support and drive means comprising a mounting bracket and a support bracket, feed bar support means on said support bracket supporting said feed bars for longitudinal and lateral reciprocation relative to said support bracket and including means releasably coupled with said corresponding ends of said feed bars, means to reciprocate said feed bar support means longitudinally and laterally relative to said support bracket, means pivotally interconnecting said support bracket and mounting bracket for pivotal movement of said support bracket relative to said mounting bracket between a first position locating said feed bar support means for coupling with said corresponding ends of said feed bars and a second position spaced from said first position in the direction away from said corresponding ends, and means releasably holding said support bracket in said first position.

* * * * *